(12) United States Patent
Shinohara et al.

(10) Patent No.: US 11,437,873 B2
(45) Date of Patent: Sep. 6, 2022

(54) STATOR WITH SPLIT IRON CORES AND INSULATORS WITH PROTRUSIONS

(71) Applicant: Mitsubishi Electric Corporation, Tokyo (JP)

(72) Inventors: Masaki Shinohara, Tokyo (JP); Daisuke Shijo, Tokyo (JP); Takao Ishibashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 43 days.

(21) Appl. No.: 16/970,037

(22) PCT Filed: Apr. 9, 2019

(86) PCT No.: PCT/JP2019/015443
§ 371 (c)(1),
(2) Date: Aug. 14, 2020

(87) PCT Pub. No.: WO2019/198708
PCT Pub. Date: Oct. 17, 2019

(65) Prior Publication Data
US 2021/0099033 A1   Apr. 1, 2021

(30) Foreign Application Priority Data

Apr. 13, 2018   (JP) .............................. JP2018-077252

(51) Int. Cl.
*H02K 1/14*   (2006.01)
*H02K 1/18*   (2006.01)
(Continued)

(52) U.S. Cl.
CPC ............. *H02K 1/148* (2013.01); *H02K 1/185* (2013.01); *H02K 1/278* (2013.01); *H02K 15/022* (2013.01); *H02K 21/16* (2013.01)

(58) Field of Classification Search
CPC ........ H02K 1/148; H02K 1/185; H02K 1/278; H02K 21/16; H02K 15/0012; H02K 15/10;
(Continued)

(56) References Cited

U.S. PATENT DOCUMENTS 3,339,097 A * 8/1967 Dunn ..................... H02K 3/522
310/194
3,921,292 A * 11/1975 Ivchenko ............... A61C 13/00
433/199.1
(Continued)

FOREIGN PATENT DOCUMENTS

| JP | 2008043107 A | 2/2008 |
|----|--------------|--------|
| JP | 4725455 B2   | 4/2011 |
| JP | 2011072093 A | 4/2011 |

OTHER PUBLICATIONS

International Search Report (PCT/ISA/210) dated Jun. 25, 2019, by the Japan Patent Office as the International Searching Authority for International Application No. PCT/JP2019/015443.
(Continued)

*Primary Examiner* — Maged M Almawri
(74) *Attorney, Agent, or Firm* — Buchanan Ingersoll & Rooney PC

(57) ABSTRACT

A plurality of split iron cores combined with each other to form an annular shape and having yoke portions arranged along an outer circumference of the annular shape and tooth portions protruding to an inner side in a radial direction from the yoke portions, insulators disposed at both ends in an axial direction of each split iron core, and a coil wound around each tooth portion through at least parts of the insulators, are included. The insulators have protrusions protruding from end surfaces in a circumferential direction of each yoke portion. When the coil is wound around the
(Continued)

tooth portion, each protrusion is deformed, thereby being fixed together with the yoke portion.

16 Claims, 25 Drawing Sheets

(51) Int. Cl.
    *H02K 1/278*     (2022.01)
    *H02K 15/02*     (2006.01)
    *H02K 21/16*     (2006.01)

(58) Field of Classification Search
    CPC ........ H02K 2213/12; H02K 3/30; H02K 3/32; H02K 3/34; H02K 3/345; H02K 3/522
    USPC .................................. 310/194, 43, 214, 215
    See application file for complete search history.

(56) References Cited

U.S. PATENT DOCUMENTS

| | | | | |
|---|---|---|---|---|
| 4,093,288 | A * | 6/1978 | Suzuki | F16B 2/08 292/321 |
| 4,257,286 | A * | 3/1981 | Ohyama | F16H 55/28 74/411 |
| 4,273,531 | A * | 6/1981 | Hasegawa | A61C 19/04 433/27 |
| 4,290,629 | A * | 9/1981 | Ueda | B60R 22/06 280/806 |
| 4,352,610 | A * | 10/1982 | Yankovoy | B23B 51/0426 408/209 |
| 4,354,328 | A * | 10/1982 | Ainoura | B24B 33/081 451/542 |
| 4,363,624 | A * | 12/1982 | Johnston | A61K 6/77 433/219 |
| 4,377,887 | A * | 3/1983 | Valestin | B65D 63/06 24/DIG. 48 |
| 4,443,197 | A * | 4/1984 | Fusayama | A61K 6/887 106/35 |
| 4,461,417 | A * | 7/1984 | Furutsu | B65C 7/005 227/67 |
| 4,499,928 | A * | 2/1985 | Furutsu | E04G 21/122 156/481 |
| 4,502,187 | A * | 3/1985 | Kitagawa | B65D 63/1063 24/17 AP |
| 4,507,828 | A * | 4/1985 | Furutsu | B65D 63/1063 24/17 AP |
| 4,516,886 | A * | 5/1985 | Wright | E21D 20/025 405/259.6 |
| 4,538,754 | A * | 9/1985 | Furutsu | B65C 7/005 227/67 |
| 4,558,854 | A * | 12/1985 | Suzuki | B25B 5/107 269/93 |
| 4,570,769 | A * | 2/1986 | Isaka | F16D 41/12 192/108 |
| 4,604,060 | A * | 8/1986 | Weissman | A61C 13/30 433/221 |
| 4,627,131 | A * | 12/1986 | Iwata | D01H 4/32 19/112 |
| 4,761,581 | A * | 8/1988 | Watanabe | H02K 3/493 310/43 |
| 4,766,825 | A * | 8/1988 | Yamamoto | D05B 35/08 112/146 |
| 4,815,948 | A * | 3/1989 | Aurelio | F04B 53/1065 417/413.1 |
| 4,848,172 | A * | 7/1989 | Morishita | F02N 15/046 475/345 |
| 4,863,382 | A * | 9/1989 | Bookstaber | A61C 13/273 433/172 |
| 4,869,623 | A * | 9/1989 | Takeshita | B23D 37/22 407/14 |
| 4,903,369 | A * | 2/1990 | Kitamura | A47L 9/0666 15/384 |
| 4,919,616 | A * | 4/1990 | Croll | A61C 19/10 433/141 |
| 4,963,093 | A * | 10/1990 | Dragan | A61C 5/66 433/90 |
| 4,967,451 | A * | 11/1990 | Boyn | B65D 33/12 24/30.5 R |
| 4,974,614 | A * | 12/1990 | Selker | A61C 15/041 132/321 |
| 4,985,982 | A * | 1/1991 | Lohr | B23D 47/005 83/471 |
| 4,997,367 | A * | 3/1991 | Kassel | A61C 5/85 433/226 |
| 5,183,403 | A * | 2/1993 | Masuhara | A61C 7/12 433/8 |
| 5,207,367 | A * | 5/1993 | Dunn | B65D 83/0882 206/509 |
| 5,215,460 | A * | 6/1993 | Perry | A61C 19/055 433/173 |
| 5,221,202 | A * | 6/1993 | James | A61C 7/12 206/63.5 |
| 5,227,688 | A * | 7/1993 | Gotoh | H01R 39/381 310/239 |
| 5,230,619 | A * | 7/1993 | Wong | A61C 7/12 433/9 |
| 5,232,365 | A * | 8/1993 | Ikehara | A61C 13/0003 433/213 |
| 5,272,494 | A * | 12/1993 | Kamon | G02C 5/18 351/111 |
| 5,289,836 | A * | 3/1994 | Peng | A61C 15/041 132/321 |
| 5,331,237 | A * | 7/1994 | Ichimura | H02K 37/14 310/49.15 |
| 5,458,251 | A * | 10/1995 | Eguchi | B65D 41/62 215/256 |
| 5,624,262 | A * | 4/1997 | Yarovesky | A61C 5/20 433/223 |
| 5,662,232 | A * | 9/1997 | Eguchi | B65D 41/62 215/256 |
| 5,807,454 | A * | 9/1998 | Kawabe | B29C 70/443 156/289 |
| 5,860,806 | A * | 1/1999 | Pranitis, Jr | A61C 5/60 433/80 |
| 5,957,610 | A * | 9/1999 | Yamanaka | B43K 1/003 401/265 |
| 6,041,467 | A * | 3/2000 | Roberts | A46B 9/005 132/309 |
| 6,509,665 | B1 * | 1/2003 | Nishiyama | H02K 9/223 310/194 |
| 6,870,292 | B2 * | 3/2005 | Owada | H02K 3/24 310/194 |
| 7,382,075 | B2 * | 6/2008 | Wang | H02K 3/522 310/260 |
| 8,754,562 | B2 * | 6/2014 | Platon | H02K 5/132 310/215 |
| 2003/0098630 | A1 * | 5/2003 | Owada | H02K 3/24 310/194 |
| 2005/0012413 | A1 * | 1/2005 | Bott | H02K 3/522 310/71 |
| 2005/0044692 | A1 * | 3/2005 | Takano | H02K 15/095 29/605 |
| 2007/0222324 | A1 * | 9/2007 | Fukui | H02K 3/522 310/260 |
| 2009/0189474 | A1 * | 7/2009 | van Heyden | H02K 3/522 310/195 |
| 2010/0188181 | A1 * | 7/2010 | Urano | H02K 3/522 336/198 |
| 2010/0213784 | A1 * | 8/2010 | Iizuka | H02K 3/325 29/596 |
| 2010/0275436 | A1 * | 11/2010 | Kiyono | H02K 15/12 29/596 |
| 2012/0098380 | A1 * | 4/2012 | Wang | H02K 15/0442 310/260 |
| 2012/0286619 | A1 * | 11/2012 | Tsuiki | H02K 3/522 310/215 |

(56) References Cited

U.S. PATENT DOCUMENTS

| | | | |
|---|---|---|---|
| 2013/0020885 A1* | 1/2013 | Hsieh | H02K 5/08 |
| | | | 310/43 |
| 2013/0193800 A1* | 8/2013 | Yokogawa | H02K 3/522 |
| | | | 310/215 |
| 2019/0181711 A1* | 6/2019 | Hattori | H02K 3/48 |

OTHER PUBLICATIONS

Written Opinion (PCT/ISA/237) dated Jun. 25, 2019, by the Japan Patent Office as the International Searching Authority for International Application No. PCT/JP2019/015443.

* cited by examiner

STATOR WITH SPLIT IRON CORES AND INSULATORS WITH PROTRUSIONS

TECHNICAL FIELD

The present disclosure relates to a stator for a rotary electric machine, a rotary electric machine, and a producing method for a stator for a rotary electric machine that allow reduction in production cost.

BACKGROUND ART

Conventionally, a technique has been proposed in which a core for a rotary electric machine is formed by combining a plurality of split cores split in a circumferential direction. Each split core is composed of a yoke portion and a tooth portion, and is formed by stacking steel sheets that are formed in substantially a T shape. Further, at a portion where winding is performed on the split core, an insulator (insulating member) made of, for example, synthetic resin is externally mounted for allowing winding of a magnet wire while ensuring insulation between the coil and stacked steel sheets.

In a case where the insulator is formed as a separate part and then integrated with the split core, the insulator may be split into three parts in order to provide the insulator over the entire circumference of the portion where winding is performed on the split core. In the case of this type of insulator, a pair of L-shaped members for covering three surface portions which are longitudinal wall portions on both sides in the circumferential direction of the tooth portion of the split core and one coil-end-side end surface, are arranged so as to oppose each other, and the other coil-end-side end surface of the split core is covered by a protrusion member formed so as to protrude in an axial direction from the other coil-end-side end surface (see, for example, Patent Document 1).

In the case of winding a magnet wire around the split core described in Patent Document 1, the magnet wire is wound in a state where an insulator composed of a plurality of split parts is assembled to the split core. Therefore, by tension applied to the coil during winding, the parts composing the insulator and the split core are displaced from a predetermined positional relationship, so that the magnet wire cannot be located at a predetermined position on the split core. Thus, regularity of the coil deteriorates, whereby performance of the rotary electric machine might deteriorate.

Accordingly, in order to prevent occurrence of the above-described "displacement", the following insulator has been proposed as an insulator having another shape: an insulator including side wall members provided so as to side surfaces along the longitudinal direction of a split core, and protrusion members provided so as to protrude outward from both ends in the longitudinal direction in order to guide a wire on the outer sides of both ends in the longitudinal direction of the split core. In this technique, the protrusion members have flange portions for covering the wire on the outer sides of both ends in the longitudinal direction of the split core, from the inner and outer sides in the radial direction of a core.

Each flange portion has a retained surface with which a retaining member for pressing the protrusion member in the radial direction of the core so as to fix the protrusion member comes into contact at the time of winding a magnet wire. A retaining surface, of the retaining member, that comes into contact with the retained surface has an engagement projection/recess portion, and the retained surface has an engagement projection/recess portion having a shape to be engaged with the engagement projection/recess portion of the retaining surface. At the time of winding the magnet wire, the retaining member and the protrusion member are engaged and fixed with each other. The protrusion member has engaging pieces for preventing the side wall members from being separated from the split core (see, for example, Patent Document 2).

CITATION LIST

Patent Document

Patent Document 1: Japanese Laid-Open Patent Publication No. 2008-43107
Patent Document 2: Japanese Laid-Open Patent Publication No. 2011-72093

SUMMARY OF THE INVENTION

Problems to be Solved by the Invention

In winding of a magnet wire around a conventional split core such as the split core proposed in Patent Document 2, a protrusion member is pressed and fixed at retained surfaces thereof, whereby positional displacement between the protrusion member and a side wall member of the insulator due to tension applied to the magnet wire at the time of winding can be prevented. However, it is necessary to perform replacement with a dedicated retaining tool for each machine type according to variation in the shape of the split core and the protrusion member in the case of producing different types of rotary electric machines, in particular, variation in the curvatures of the retained surfaces of the protrusion member and variation in the position in the axial direction at which the protrusion member is disposed. Thus, a problem arises in that labor for replacement work and cost for the dedicated retaining tool are required.

The present disclosure discloses a technology for solving the above-described problems, and an object of the present disclosure is to provide a stator for a rotary elect machine, a rotary electric machine, and a producing method for a stator for a rotary electric machine that allow reduction in production cost.

Solution to the Problems

A stator for a rotary electric machine according to the present disclosure is a stator for a rotary electric machine, the stator including:
  a plurality of split iron cores which are combined with each other to form an annular shape, and which have yoke portions arranged along an outer circumference of the annular shape and tooth portions protruding to an inner side in a radial direction from the yoke portions;
  insulators disposed at both ends in an axial direction of each split iron core; and
  a coil wound around each tooth portion through at least parts of the insulators, wherein
  the insulators have protrusions protruding from end surfaces in a circumferential direction of each yoke portion, and,
  when the coil is wound around the tooth portion, each protrusion is deformed, thereby being fixed together with the yoke portion.

A rotary electric machine according to the present disclosure is a rotary electric machine including:

a rotor having an outer circumferential surface that opposes an inner circumferential surface of the stator, the rotor being retained so as to be rotatable about a rotation shaft disposed at a center in the radial direction of the stator; and a frame covering at least a part of an outer circumferential surface of the stator and supporting the rotation shaft.

A producing method for a stator for a rotary electric machine according to the present disclosure is a producing method for a stator for a rotary electric machine, the stator including:

a plurality of split iron cores which are combined with each other to form an annular shape, and which have yoke portions arranged along an outer circumference of the annular shape and tooth portions protruding to an inner side in a radial direction from the yoke portions;

insulators disposed at both ends in an axial direction of each split iron core; and a coil wound around each tooth portion through at least parts of the insulators, the producing method including:

a retaining step of pressing and deforming, by using holding claws disposed at both ends in a circumferential direction of each of the yoke portions of the spit iron cores, protrusions which are formed on the insulators and which protrude from both end surfaces in the circumferential direction of the yoke portion, thereby holding the protrusions together with both end surfaces in the circumferential direction of the yoke portion and retaining the insulators together with the split iron core; and a winding step of winding, by a winding machine, the coil around the tooth portion of each split iron core through at least parts of the insulators.

Effect of the Invention

The stator for a rotary electric machine, the rotary electric machine, and the producing method for a stator for a rotary electric machine according to the present disclosure allow reduction in production cost.

DESCRIPTION OF EMBODIMENTS

Embodiment 1

In the following description, directions in a rotary electric machine 100 are defined as a circumferential direction Z, an axial direction Y, an upper side Y1 in the axial direction Y, a lower side Y2 in the axial direction Y, a radial direction X, an outer side X1 in the radial direction X, and an inner side X2 in the radial direction X. Thus, also for a stator 3, a rotor 2, and other portions, directions will be indicated using these directions as references, for description.

Figure 1:
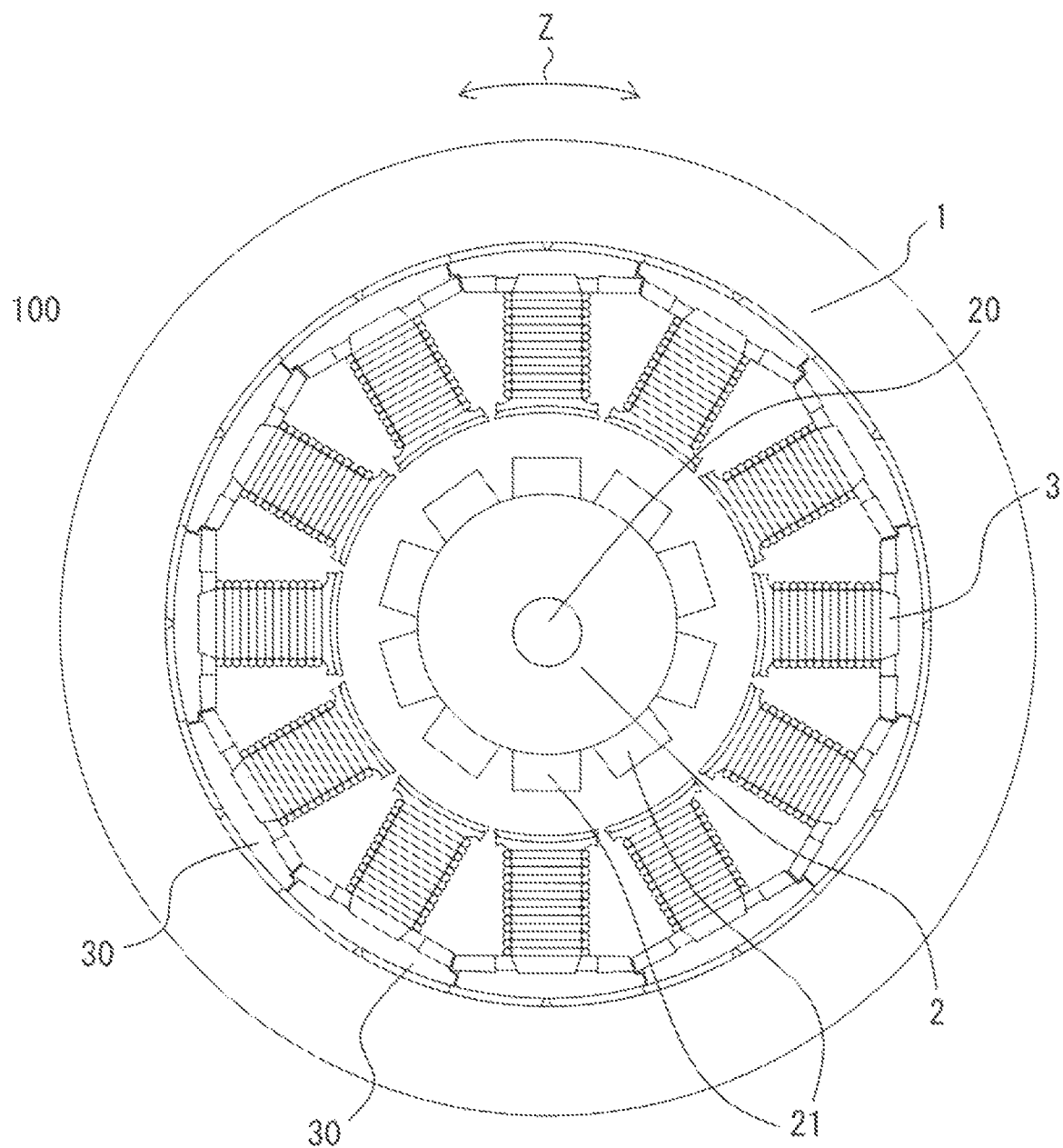
FIG. 1 is a cross-sectional view showing a configuration of a rotary electric machine according to embodiment 1.
Figure 2:
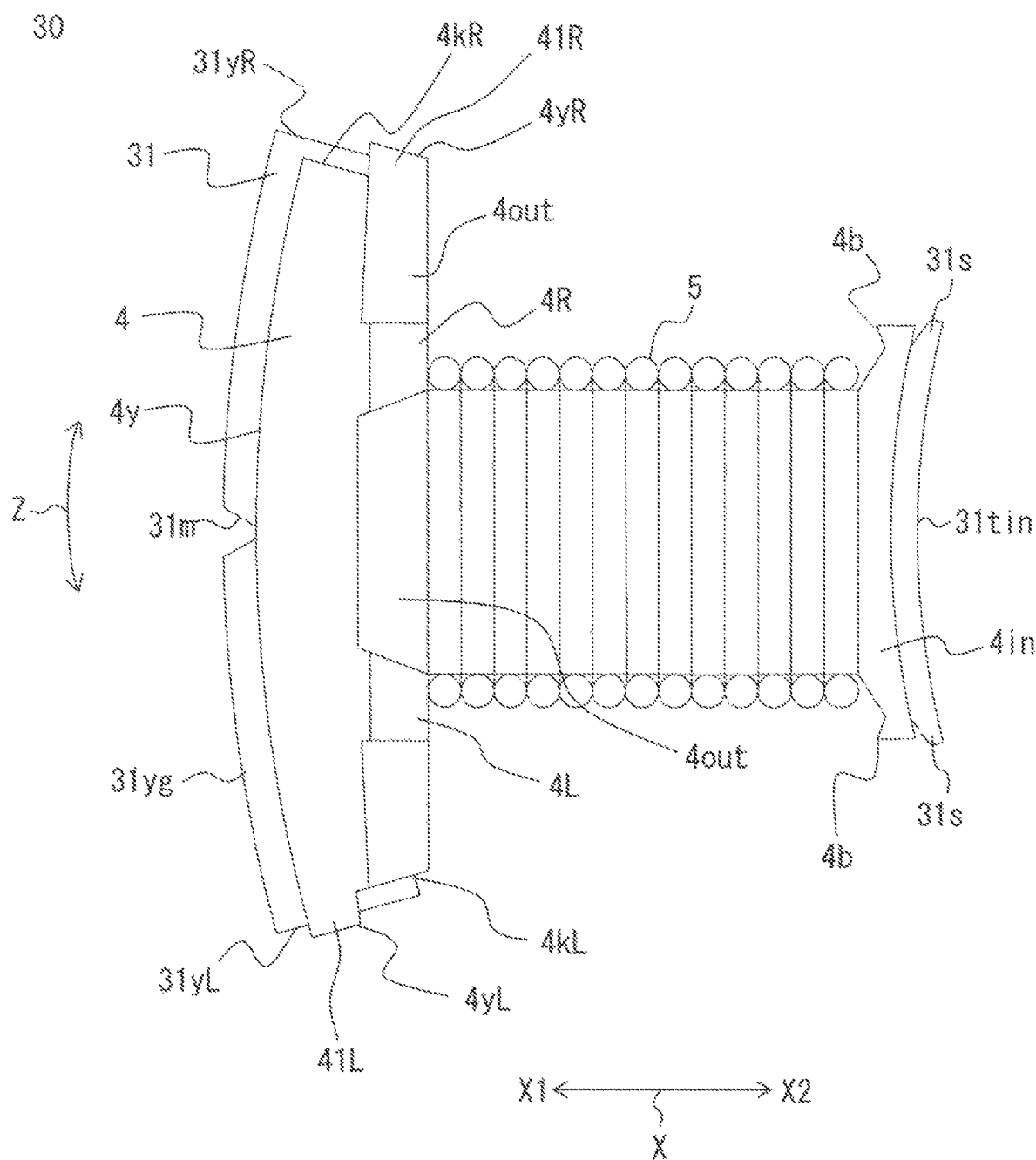
FIG. 2 is a plan view showing a configuration of a split core unit of the rotary electric machine shown in FIG. 1.
Figure 3:
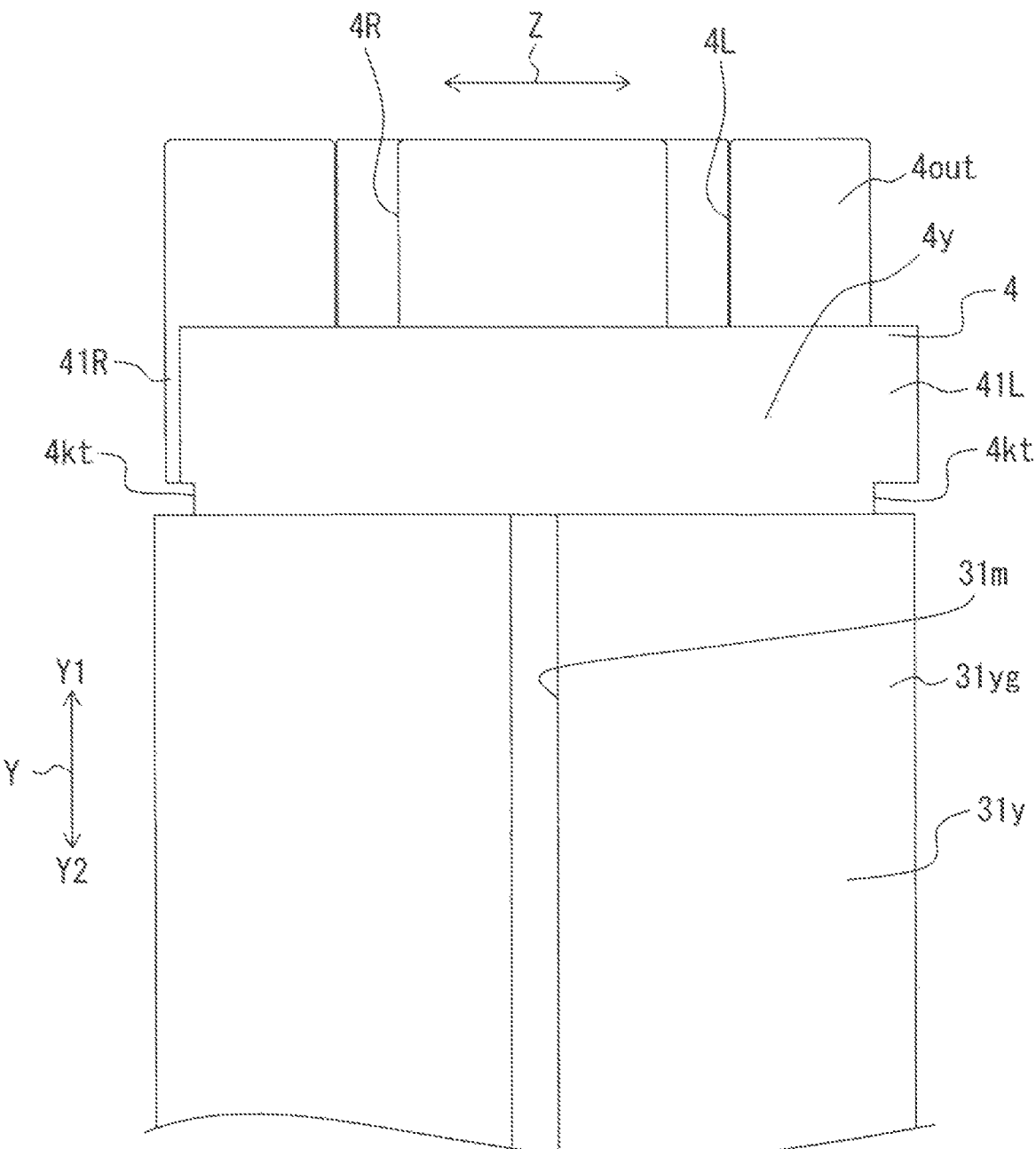
FIG. 3 is a side view showing the configuration of the split core unit shown in FIG. 2.
Figure 4:
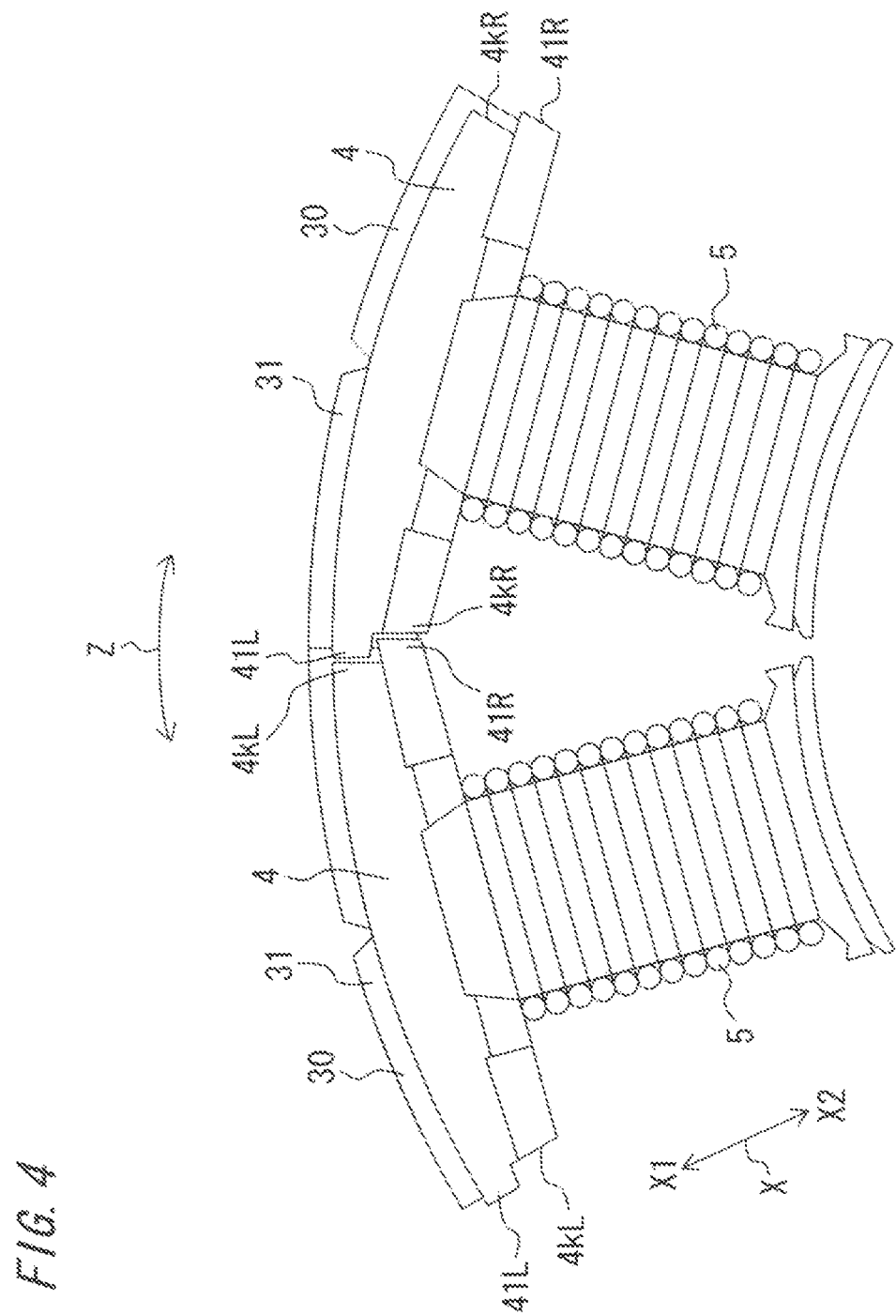
FIG. 4 is a plan view indicating a state where split core units each shown in FIG. 2 are annularly assembled.

FIG. 1 is a cross-sectional view showing a configuration of a rotary electric machine according to embodiment 1. FIG. 2 is a plan view showing a configuration of one split core unit of the rotary electric machine shown in FIG. 1. FIG. 3 is a side view showing a configuration of a portion on the upper side Y1 in the axial direction Y of the split core unit shown in FIG. 2. FIG. 4 is a plan view indicating a state where split core units each shown in FIG. 2 are assembled in an annular shape. Specifically, FIG. 4 is a plan view indicating a state where two of the split core units are disposed so as to be adjacent to each other in the circumferential direction Z.

Figure 5:
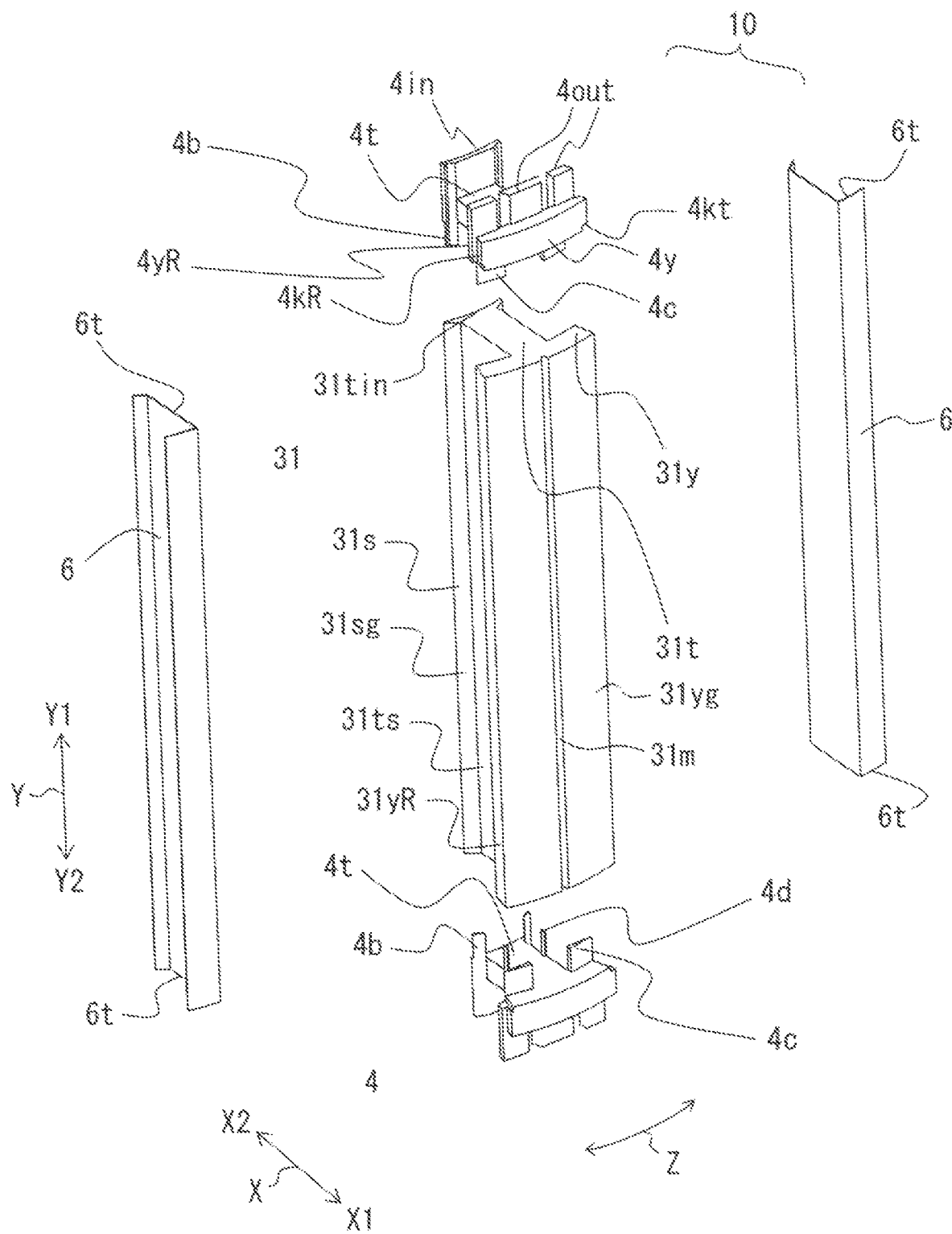
FIG. 5 is an exploded perspective view showing an assembly configuration of the split core unit shown in FIG. 2.
Figure 6:
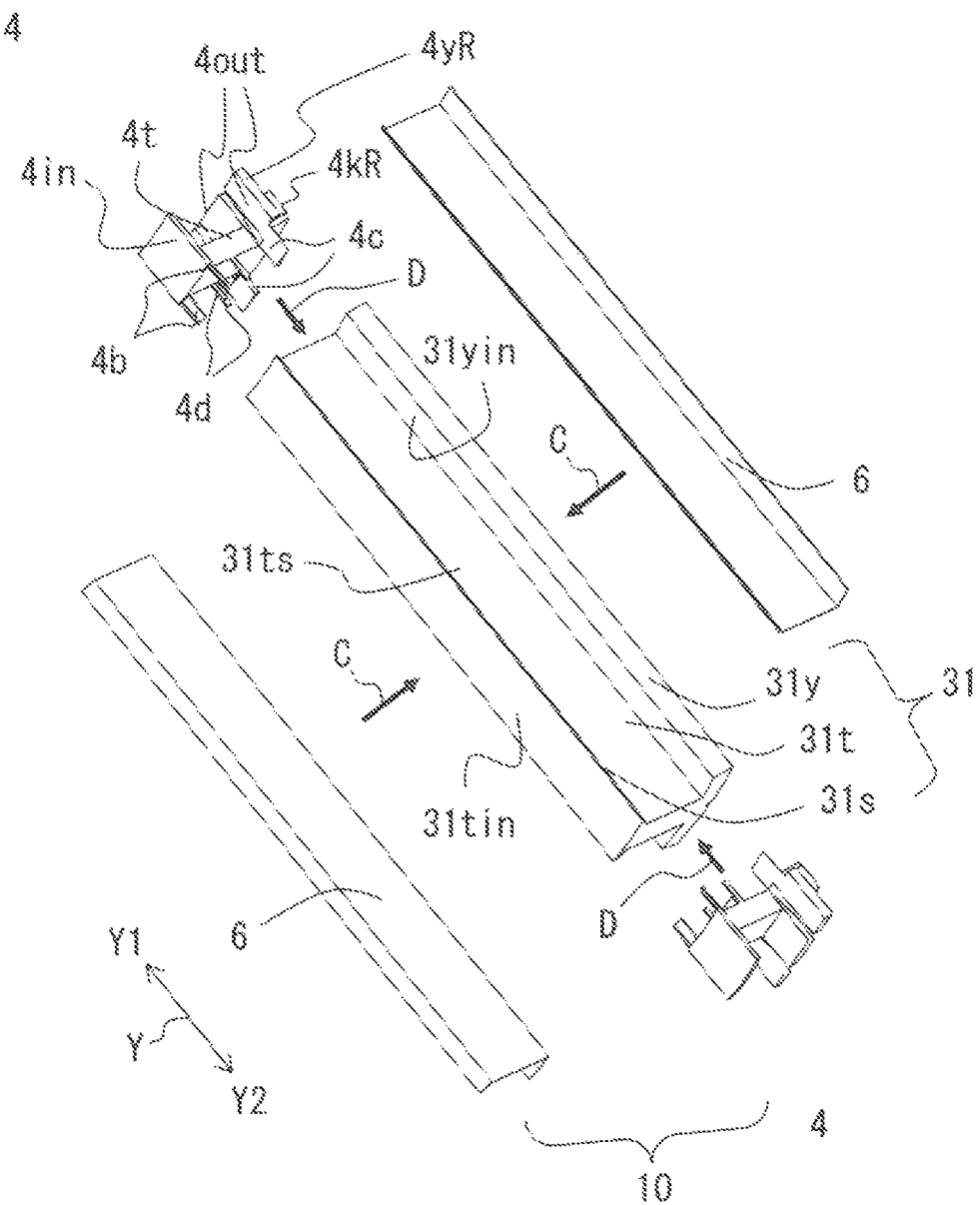
FIG. 6 is an exploded perspective view showing an assembly configuration of the split core unit shown in FIG. 2.
Figure 7:
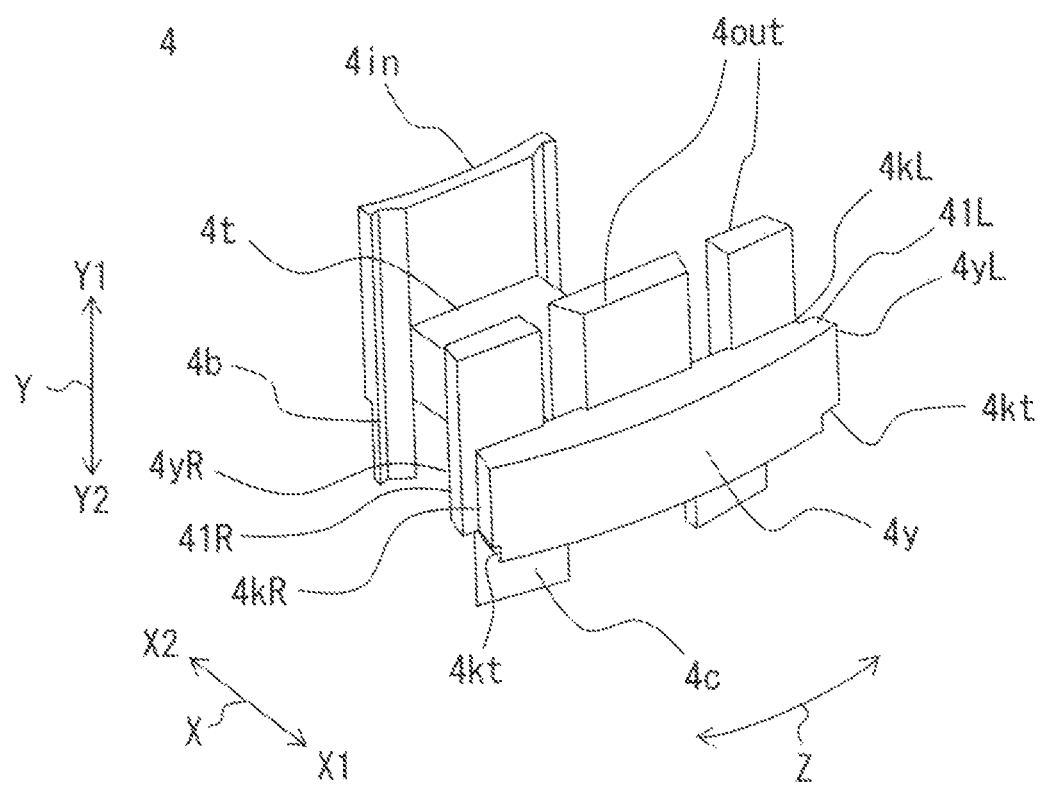
FIG. 7 is a perspective view showing a configuration of an axial-end surface portion of the split core unit shown in FIG. 5.
Figure 8:
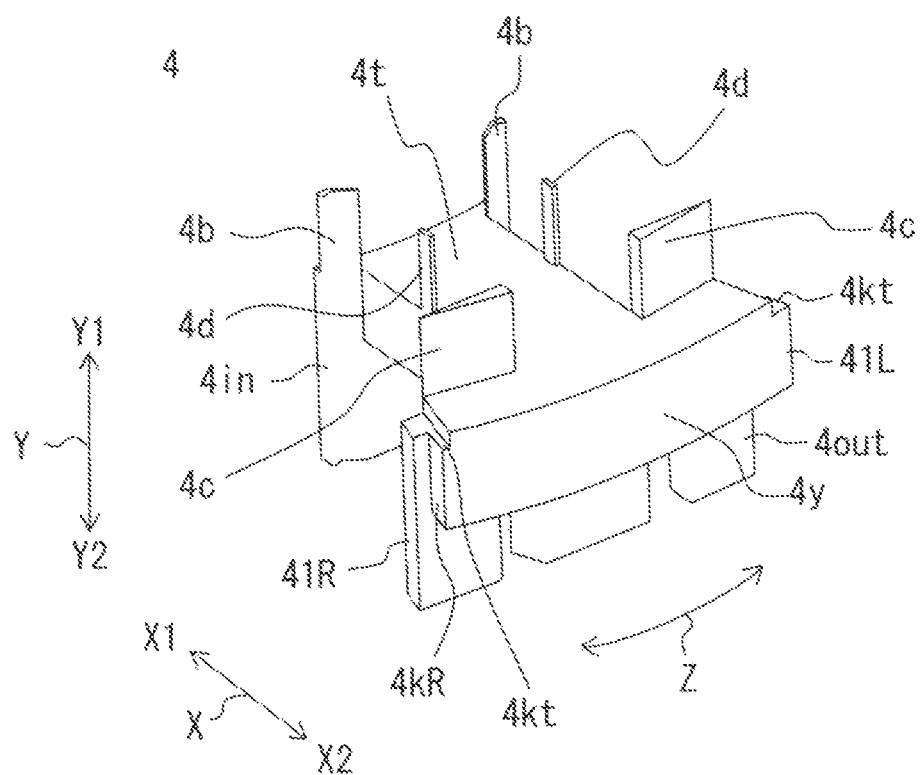
FIG. 8 is a perspective view showing the configuration of the axial-end surface portion of the split core unit shown in FIG. 5.
Figure 9:
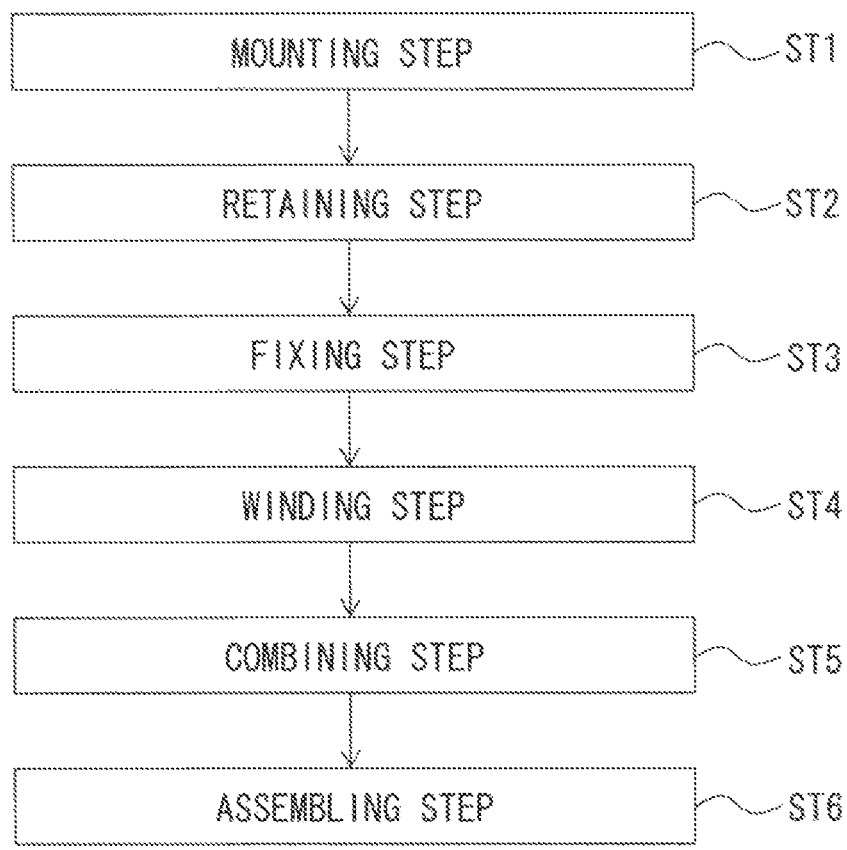
FIG. 9 is a flowchart indicating a producing method for the rotary electric machine shown in FIG. 1.
Figure 12:
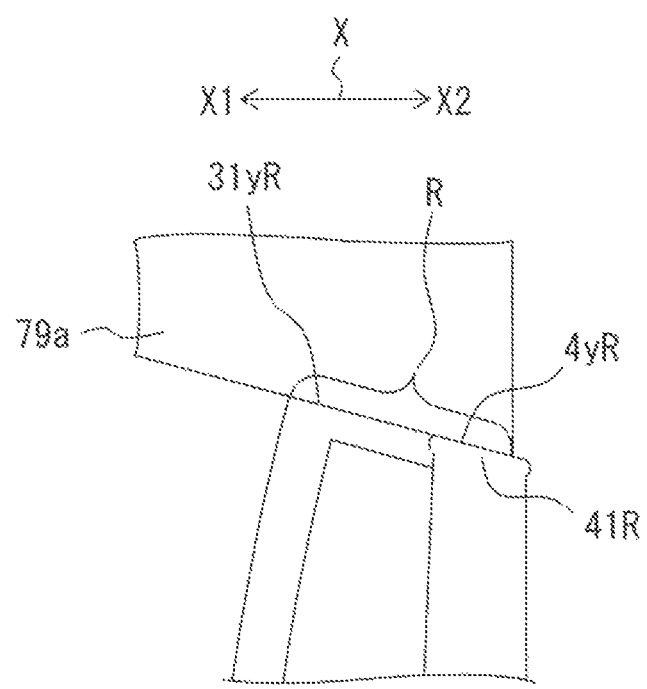
FIG. 12 is a diagram for explaining a state in the producing method for the split core unit shown in FIG. 11.
Figure 13:
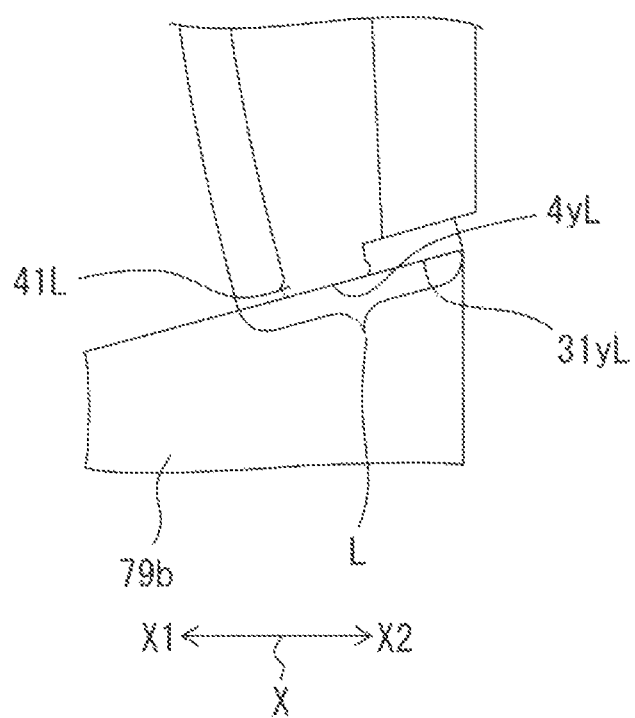
FIG. 13 is a diagram for explaining a state in the producing method for the split core unit shown in FIG. 11.
Figure 15:
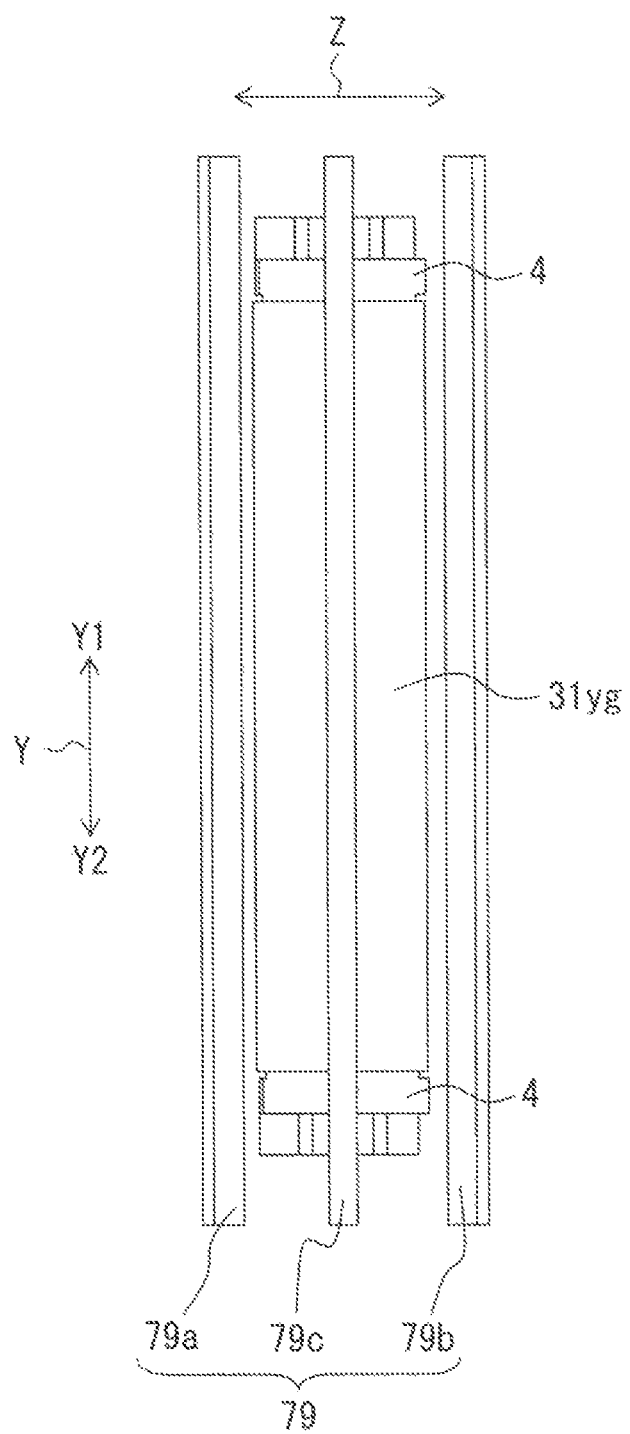
FIG. 15 is a diagram for explaining the producing method for the split core unit according to embodiment 1.
Figure 16:
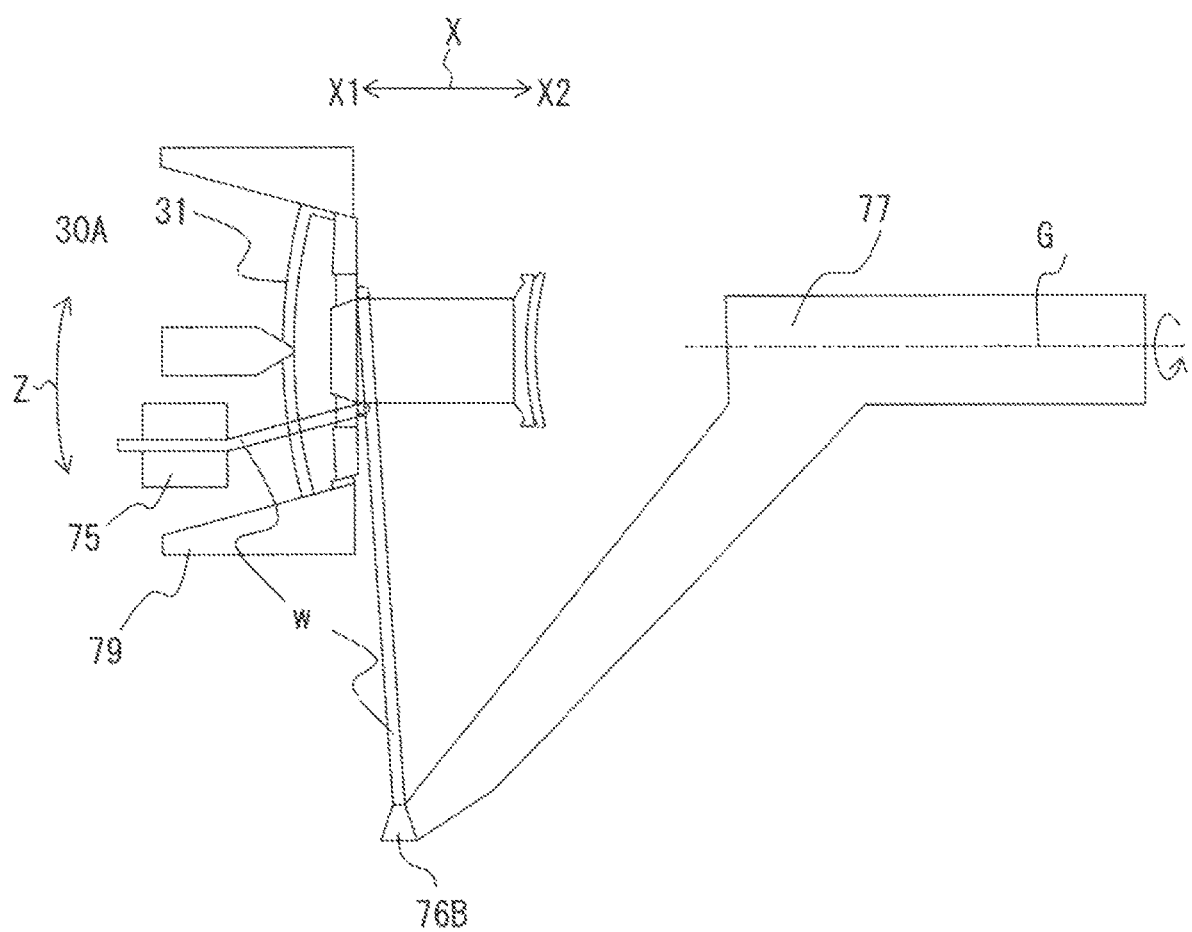
FIG. 16 is a diagram for explaining another producing method for the split core unit according to embodiment.

FIG. 5 and FIG. 6 are each an exploded perspective view showing an assembly configuration of the split core unit shown in FIG. 2. FIG. 7 and FIG. 8 are each a perspective view showing a configuration of an axial-end surface portion of the split core unit shown in FIG. 5. FIG. 9 is a flowchart indicating a producing method for the rotary electric machine shown in FIG. 1. FIG. 10, FIG. 11, FIG. 14, and FIG. 15 are each a diagram for explaining a producing method for the split core unit according to embodiment 1. FIG. 12 and FIG. 13 are each a diagram indicating a state in the producing method for the split core unit shown in FIG. 11. FIG. 12 is an enlarged view of the region E enclosed by a dotted line in FIG. 11. FIG. 13 is an enlarged view of the region F enclosed by a dotted line in FIG. 11. FIG. 16 is a diagram for explaining another producing method for the split core unit according to embodiment 1.

As shown in FIG. 1, the rotary electric machine 100 includes a frame 1, a rotor 2, and a stator 3. The frame 1 is formed in a hollow cylindrical shape, and supports a rotation shaft 20. The frame 1 covers at least a part of the outer circumferential surface of the stator 3. Here, the stator 3 is disposed such that the outer circumferential surface of the stator 3 is fitted to the inner circumferential surface of the frame 1. The rotor 2 has an outer circumferential surface that opposes the inner circumferential surface of the stator 3. The rotor 2 is supported on the inner side X2 in the radial direction X to the frame 1 by a bearing (not shown) so as to be rotatable, with respect to the stator 3, about the rotation shaft 20 disposed at the center in the radial direction X of the stator 3. The rotor 2 has ten magnets 21 arranged such that the outer circumferential surfaces thereof oppose the inner circumferential surface of the stator 3. The number of the magnets 21 is not limited to ten.

The stator 3 is formed by combining 12 split core units 30 with each other in an annular shape. The number of the split core units 30 is not limited to 12. As shown in FIG. 2 to FIG. 4, each split core unit 30 includes a split core 31 as a split iron core, a coil 5, and insulation portions 10. The split core 31 is formed by stacking steel sheets in the axial direction Y. The split core 31 has a yoke portion 31$y$ and a tooth portion 31$t$.

The outer sides X1 in the radial direction X of the yoke portions 31$y$ are referred to as outer circumferential surfaces 31$y$g which are arranged along the outer circumference of the annular shape of the stator 3. The inner side X2 in the radial direction X is referred to as an inner circumferential surface 31$y$in. Both ends in the circumferential direction Z are referred to as an end surface 31$y$R and an end surface 31$y$L. Each of the outer circumferential surfaces 31$y$g of the yoke portions 31$y$ is formed in an arc shape so as to protrude to the outer side X1 in the radial direction X. An insertion groove 31$m$ extending in the axial direction Y is formed at the center in the circumferential direction Z of the outer circumferential surface 31$y$g of the yoke portion 31$y$.

The tooth portion 31$t$ is formed so as to protrude from the inner circumferential surface 31$y$in of the yoke portion 31$y$ to the inner side X2 in the radial direction X. The inner side X2 in the radial direction X of the tooth portion 31$t$ is referred to as an end 31$t$in, and both ends in the circumferential direction Z of the tooth portion 31$t$ are referred to as side surfaces 31$t$s. Shoe portions 31$s$ which respectively protrude to both sides in the circumferential direction Z are formed on the end 31$t$in of the tooth portion 31$t$. The outer side X1 in the radial direction X of each shoe portion 31$s$ is referred to as an outer circumferential surface 31$s$g. The coil 5 is formed by winding a magnet wire W around the tooth portion 31$t$.

The insulation portions 10 electrically insulate the split core 31 and the coil 5 from each other, and are disposed between the split core 31 and the coil 5. The insulation portions 10 include side surface portions 6 and axial-end surface portions 4 as insulators. The side surface portions 6 respectively cover the side surfaces 31$t$s of the tooth portion 31$t$. Further, the side surface portions 6 cover each of the inner circumferential surface 31$y$in of the yoke portion 31$y$ and the outer circumferential surfaces 31$s$g of the shoe portions 31$s$. Each side surface portion 6 is formed such that the length between ends 6$t$ thereof on the upper side Y1 and the lower side Y2 in the axial direction Y is equal to the entire length in the axial direction Y of the split core 31. The side surface portion 6 is formed of an insulative substance such as paper.

The axial-end surface portions 4 respectively cover the end surfaces on the upper side Y1 and the lower side Y2 in the axial direction Y of the tooth portion 31$t$, and also respectively cover portions on the inner side X2 in the radial direction X of the end surfaces on the upper side Y1 and the lower side Y2 in the axial direction Y of the yoke portion 31$y$. Therefore, a cross section, of the split core 31, that is perpendicular to the axial direction Y and a cross section, of each axial-end surface portion 4, that is perpendicular to the axial direction Y have substantially the same shape. Further, the axial-end surface portion 4 functions as a winding frame for the coil 5 described later, and the coil 5 is wound around the tooth portion 31$t$ through at least a part of the axial-end surface portion 4. Thus, the axial-end surface portions 4 are formed so as to respectively extend, by predetermined lengths, to the upper side Y1 and the lower side Y2 in the axial direction Y from both end surfaces on the upper side Y1 and the lower side Y2 in the axial direction Y of the split core 31. The axial-end surface portions 4 are formed of an insulative material such as a synthetic resin material. As described above, the axial-end surface portions 4 which are insulation portions 10 are formed of a material that is more likely to undergo elastic deformation or plastic deformation than the material of the split core 31.

The axial-end surface portions 4 include tooth covering portions 4$t$ and yoke covering portions 4$y$. The tooth covering portions 4$t$ cover both end surfaces on the upper side Y1 and the lower side Y2 in the axial direction Y of the tooth portion 31$t$. The yoke covering portions 4$y$ cover both end surfaces on the upper side Y1 and the lower side Y2 in the axial direction Y of the yoke portion 31$y$. Both ends in the circumferential direction Z of each yoke covering portion 4$y$ are referred to as an end surface 4$y$R and an end surface 4$y$L. The end surfaces 4$y$R and 4$y$L of the yoke covering portion 4$y$ have a protrusion 41R and a protrusion 41l, which are formed so as to protrude in the circumferential direction Z from the end surfaces 31$y$R and 31$y$L of the yoke portion 31$y$ of the split core 31, respectively.

In addition, the end surfaces 4$y$R and 4$y$L of the yoke covering portion 4$y$ have a cut portion 4$k$R and a cut portion 4$k$L which are formed at such locations as to oppose the protrusions 41R and 41L of the axial-end surface portions 4 of other split core units 30 that are adjacent in the circumferential direction Z. As shown in FIG. 4, the protrusions 41R and 41L of each axial-end surface portion 4, and the cut portions 4$k$R and 4$k$L of the axial-end surface portions 4 of other split core units 30 that are adjacent in the circumferential direction Z, are formed stepwise in the radial direction X at such positions as to oppose each other in the circumferential direction Z. Therefore, if the plurality of split core units 30 are arranged in an annular shape, the protrusions 41R and 41L of each axial-end surface portion 4 are fitted to the cut portions 4$k$R and 4$k$L of other split core units 30 that are adjacent in the circumferential direction Z as shown in FIG. 4, so that the axial-end surface portions 4 adjacent to each other in the circumferential direction Z do not interfere with each other.

In addition, the axial-end surface portion 4 includes an inner flange 4$in$ and an outer flange 4$out$ which are raised in a direction away from the tooth portion 31*t* extending in the axial direction Y. The inner flange 4*in* is formed so as to be raised from the outer circumferential surfaces 31*sg* of the shoe portions 31*s* in a direction away from the tooth portion 31*t* extending in the axial direction Y. The outer flanges 4*out* are formed along positions slightly shifted to the inner side X2 in the radial direction X from the outer circumferential surfaces 31*yg* of the yoke portions 31*y*. In addition, the outer flanges 4*out* are formed so as to be raised from both end surfaces in the axial direction Y of the yoke covering portions 4*y* in a direction away from the tooth portion 31*t* extending in the axial direction Y.

The inner flange 4*in*, the outer flange 4*out*, and the tooth covering portion 4*t* function as a winding frame for the coil 5. Therefore, the length by which the inner flange 4*in* and the outer flange 4*out* are raised in the axial direction Y from the tooth covering portion 4*t*, is set to be equal to or larger than the thickness in the axial direction Y of the coil 5 to be wound on the tooth covering portion 4*t*.

As shown in FIG. 8, the inner flange 4*in* of the axial-end surface portion 4 includes a pair of first engagement claws 4*b* to be engaged with the outer circumferential surfaces 31*sg* of the shoe portions 31*s* by elastic restoring force of resin in a state of being assembled to the split core 31. In addition, the yoke covering portion 4*y* includes a pair of second engagement claws 4*c* to be engaged with the inner circumferential surface 31*yin* of the yoke portion 31*y* by elastic restoring force of resin in a state of being assembled to the split core 31. Accordingly, the axial-end surface portions 4 can be retained in a temporarily fixed state to both end surfaces in the axial direction Y of the split core 31.

Further, the tooth covering portion 4*t* includes, at center portions in the radial direction X of end surfaces in the circumferential direction Z of the tooth covering portion 4*t*, a pair of claw portions 4*d* formed in a direction along the side surfaces 31*ts* of the tooth portion 31*t*. The claw portions 4*d* are inserted from the end 6*t* sides in the axial direction Y of the side surface portions 6 as insulation portions 10, whereby the side surface portions 6 as the insulation portions 10 are retained by being held between the claw portions 4*d* and the side surfaces 31*ts* of the tooth portion 31*t*.

An intermediate 30A of the split core unit 30 (hereinafter, the intermediate 30A of the split core unit 30 is simply referred to as "intermediate 30A"; see FIG. 10 and FIG. 11) refers to a state where a magnet wire W has not yet been wound around the split core unit 30. The coil 5 is formed by winding a magnet wire W around the tooth portion 31*t* in a state where the insulation portions 10, i.e., the side surface portions 6 and the axial-end surface portions 4, are assembled to the tooth portion 31*t* of the split core 31. The split core unit 30 is obtained by forming the coil 5 around the intermediate 30A.

In order for the axial-end surface portions 4 to thus function as winding frames for the coil 5, the outer flange 4*out* has, as shown in FIG. 2, a second groove 4L for positioning a winding-starting end of the coil 5 and leading out a magnet wire W to toe outside so as to fix the magnet wire W, and a first groove 4R for hooking and temporarily fastening a winding-finishing end after completion of winding.

In addition, as shown in FIG. 3, cut portions 4*kt* are formed in both ends in the circumferential direction Z of the yoke covering portion 4*y* at the sides where contact with the yoke portion 31*y* is made. The cut portions 4*kt* are formed such that the axial-end surface portion 4 and the yoke portions 31*y* of other split core units 30 that are adjacent in the circumferential direction Z do not interfere with each other when the split core units 30 are assembled in an annular shape.

In the above-described embodiment 1, the example has been described in which surfaces of the split core units 30 of the stator 3, at which the yoke portions 31*y* adjacent to each other in the circumferential direction Z are brought into contact with each other, are formed as flat surfaces, and the flat surfaces are brought into contact with each other to form the stator 3. However, the present disclosure is not limited to this example, and a recess portion may be formed in one of the yoke portions 31*y* of the split core units 30 adjacent to each other in the circumferential direction Z, and a protruding portion may be formed on the other yoke portion 31*y*, thereby obtaining a fitting structure.

Next, a winding device 70 as a winding machine for forming the coil 5 will be described with reference to FIG. 10, FIG. 11, FIG. 14, and FIG. 15. The winding device 70 includes a chuck 75, a nozzle 76, and a retaining tool 79 as a holding tool. The chuck 75 holds a starting end 5St which is for starting winding the coil 5 and which has been led out from the second groove 4L of the outer flange flout. The nozzle 76 feeds the magnet wire W. The retaining tool 79 retains the intermediate 30A. The retaining tool 79 includes a holding claw 79*a*, a holding claw 79*b*, and an abutment portion 79*c*. The holding claws 79*a* and 79*b* are movable in the circumferential direction Z. The abutment portion 79*c* is movable in the radial direction X. As shown in FIG. 15, the holding claws 79*a* and 79*b*, and the abutment portion 79*c*, are formed such that the lengths thereof in the axial direction Y become longer than the length in the axial direction Y of each split core 31.

Next, a producing method for each split core unit 30 of embodiment 1 configured as described above, and a producing method for the rotary electric machine 100 by using the split core units 30, will be described. First, as shown in FIG. 5 and FIG. 6, a mounting step is performed in which: the side surface portions 6 as the insulation portions 10 are mounted to each split core 31 in the directions of the arrows C; and the axial-end surface portions 4 are mounted to both ends in the axial direction Y of the split core 31 in the directions of the arrows D (step ST1 in FIG. 9).

Accordingly, the side surface portions 6 are retained on the split core 31 by the claw portions 4*d* of the axial-end surface portions 4 so as to be held therebetween. Furthermore, the pair of first engagement claws 4*b* of each axial-end surface portion 4 are engaged with the outer circumferential surfaces 31*sg* of the shoe portions 31*s* by elastic restoring force of resin in a state of being assembled to the split core 31. In addition, the pair of second engagement claws 4*c* of the axial-end surface portion 4 are engaged with the inner circumferential surface 31*yin* of the yoke portion 31*y* by elastic restoring force of resin in a state of being assembled to the split core 31.

Accordingly, the axial-end surface portions 4 can be retained in a temporarily fixed state to both end surfaces in the axial direction Y of the split core 31. In this manner, the insulation portions 10 can be fixed to the split core 31 without using any adhesive. In addition, the intermediate 30A on which the coil 5 has not yet been formed can be handled as one piece.

Figure 10:
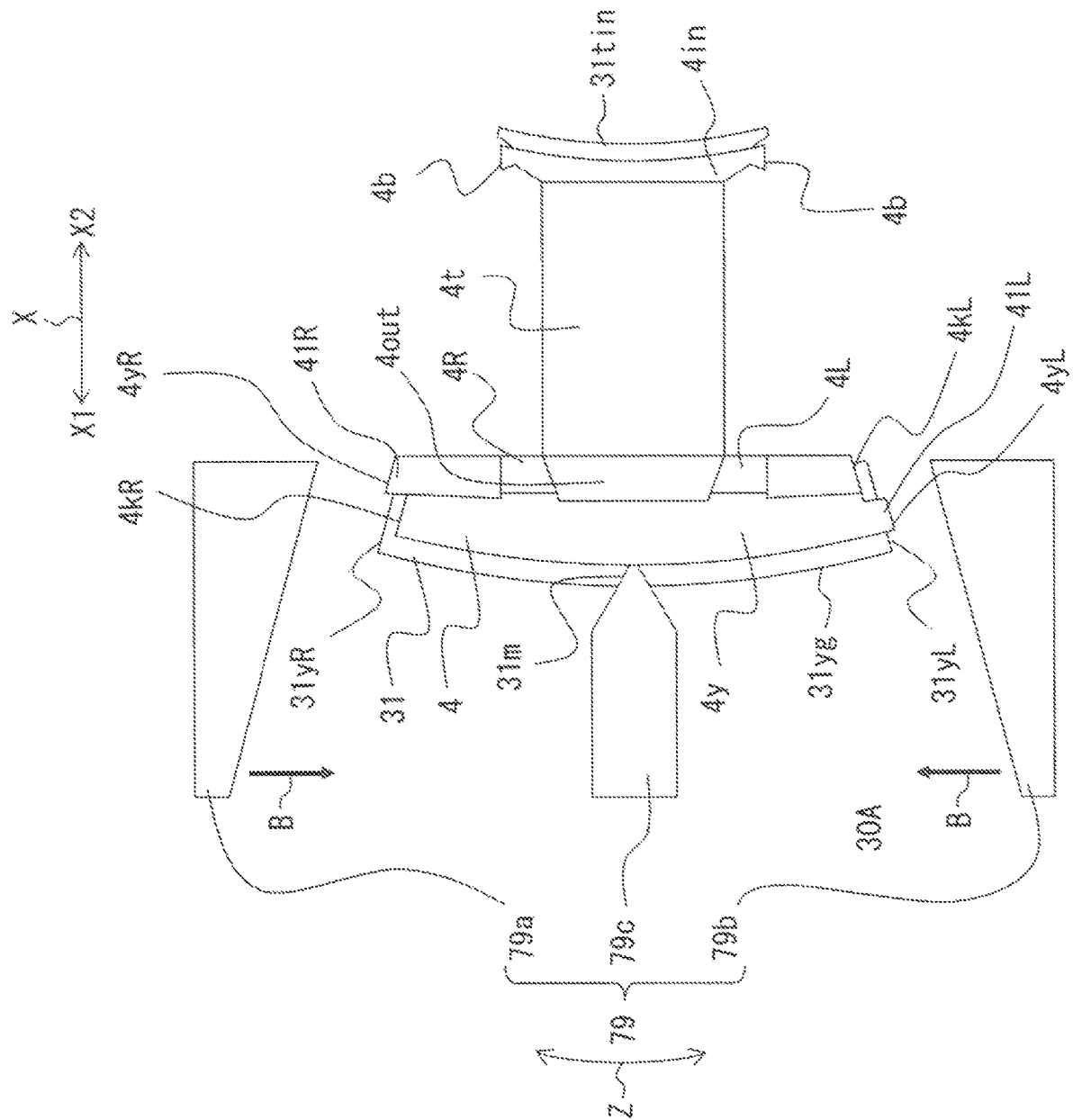
FIG. 10 is a diagram for explaining a producing method for the split core unit according to embodiment 1.

Next, as shown in FIG. 10 and FIG. 15, in a state where the holding claws 79*a* and 79*b* of the retaining tool 79 are opened so as to be apart from each other in the circumferential direction Z, the abutment portion 79*c* of the retaining tool 79 is pressed against the insertion groove 31*m* of the split core 31. Next, as indicated by the arrows B in FIG. 10, the holding claws 79a and 79b are closed so as to reduce the distance therebetween in the circumferential direction Z. Accordingly, the holding claws 79a and 79b come into contact with the protrusions 41R and 41L of the yoke covering portion 4y first. Then, the holding claws 79a and 79b are further closed so as to achieve the reduction in the circumferential direction Z, whereby the protrusions 41R and 41L are elastically deformed.

Figure 11:
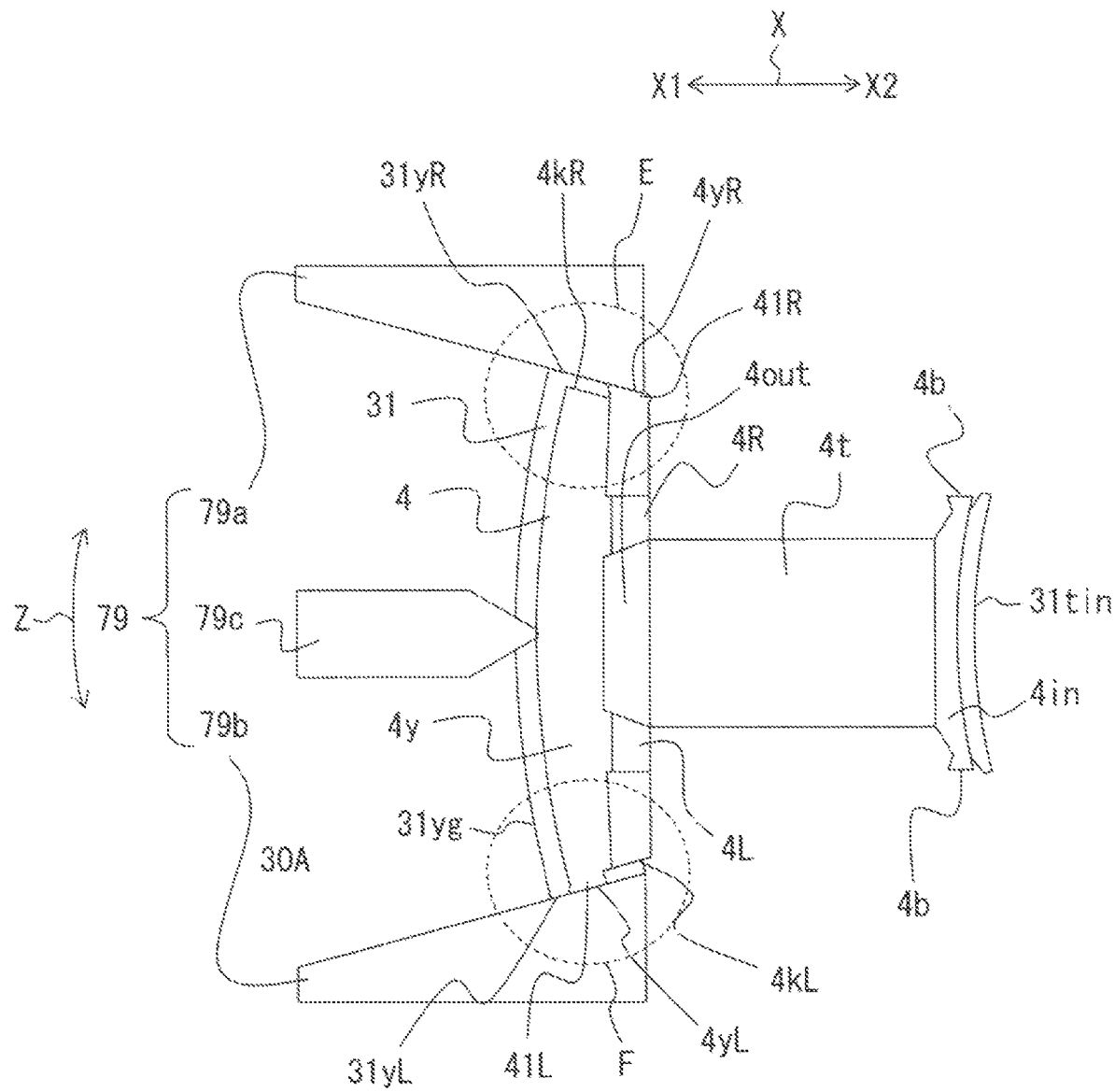
FIG. 11 is a diagram for explaining the producing method for the split core unit according to embodiment 1.

Then, the holding claws 79a and 79b are further closed so as to achieve the reduction in the circumferential direction Z, whereby, as shown in FIG. 11, the holding claws 79a and 79b move to and come into contact with the end surfaces 31yR and 31yL of the yoke portion 31y of the split core 31. Accordingly, the holding claws 79a and 79b are, by frictional forces thereof, engaged and fixed along a side wall portion R and a side wall portion L (see FIG. 12 and FIG. 13) formed by the end surfaces 31yR and 31yL of the yoke portion 31y, the end surfaces 4yR and 4yL of the axial-end surface portion 4, and the elastically deformed protrusions 41R and 41l of the axial-end surface portion 4. Accordingly, a retaining step is performed in which the two axial-end surface portions 4 and the split core 31 are assuredly retained by the retaining tool 79 (step ST2 in FIG. 9).

The state where the protrusions 41R and 41L of the axial-end surface portion 4 are elastically deformed, are shown in detail only in FIG. 11, FIG. 12, and FIG. 13. In the other drawings and embodiments described below, the state of the elastic deformation is not shown or described in detail.

Next, before the start of winding of the magnet wire W, a fixing step is performed in which the starting end 5St, from which winding is to start, is held and fixed by the chuck 75 (step ST3 in FIG. 9). Accordingly, the magnet wire W is positioned by the second groove 4L, and positioning for the winding start position is ensured. Thus, the magnet wire W can be more accurately wound to a predetermined position as compared to a case where the winding-starting end of the magnet wire W is not fixed.

Figure 14:
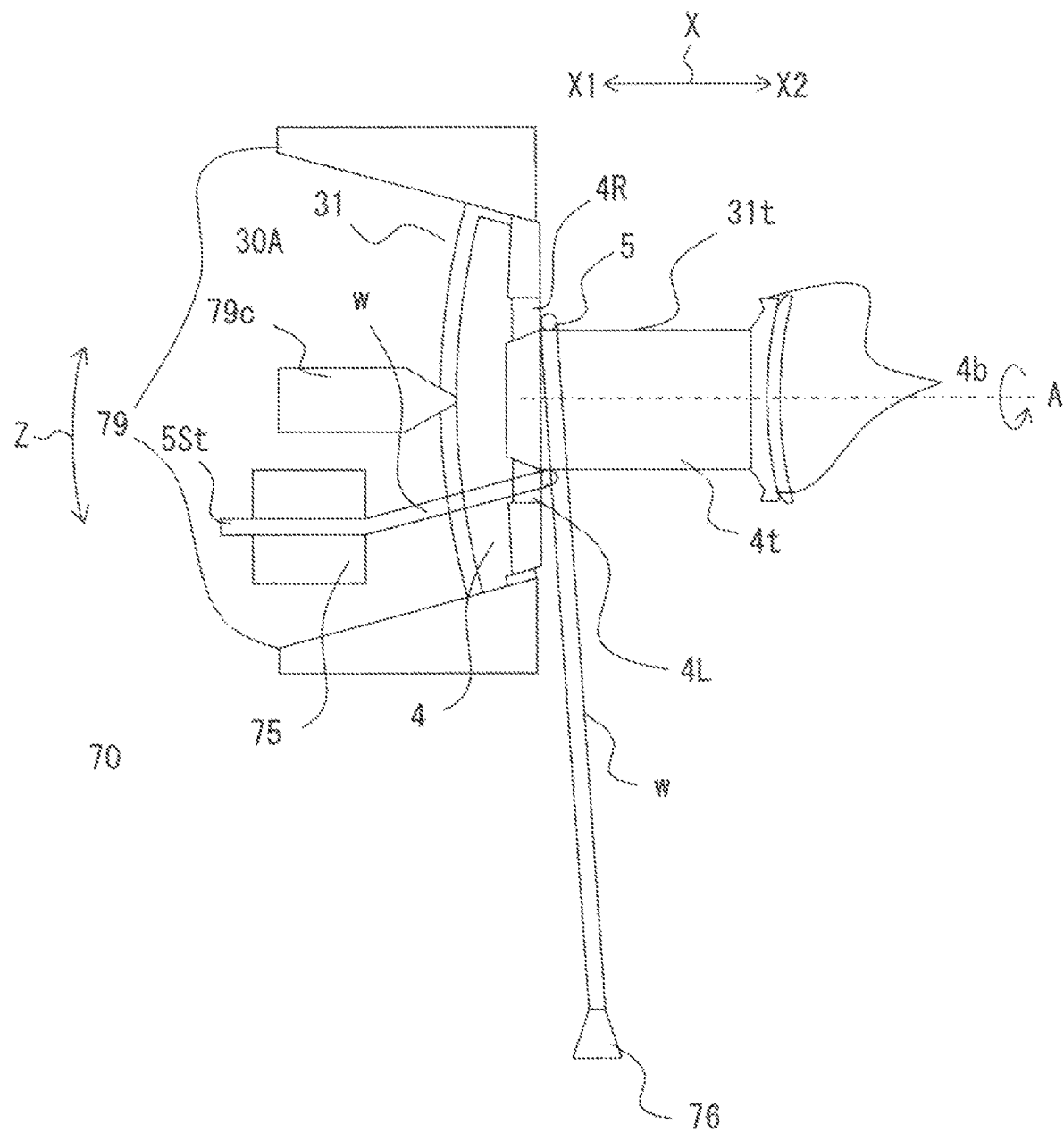
FIG. 14 is a diagram for explaining the producing method for the split core unit according to embodiment 1.

Next, as shown in FIG. 14, the nozzle 76 for feeding the magnet wire W is disposed on the inner side X2 in the radial direction X of the outer flange flout so as to be apart from the intermediate 30A in the circumferential direction Z. Then, the intermediate 30A is moved in the radial direction X while being rotated about a center axis A in the radial direction X of the tooth portion 31t. In this manner, a wire-winding step as a winding step is performed in which the coil 5 is formed by winding the magnet wire W around the intermediate 30A, to form the split core unit 30 (step ST4 in FIG. 9). Then, the winding-finishing end after completion of winding of the magnet wire W is temporarily fastened to the first groove 4R.

When the magnet wire W is wound around the intermediate 30A, tension is generated in the magnet wire W and external force is applied to the axial-end surface portion 4 owing to the tension. At this time, force for causing displacement in the circumferential direction Z relative to the split core 31 is generated in the axial-end surface portion 4. The first engagement claws 4b and the second engagement claws 4c of the axial-end surface portion 4 are temporarily fastened to the split core 31 by elastic restoring force, and thus, when the aforementioned tension is applied to the axial-end surface portion 4, if the tension is within an elasticity range, the axial-end surface portion 4 is displaced from the split core 31 in the circumferential direction Z whereas, if the tension exceeds the elasticity range, the engagement claws 4b and 4c might be broken.

However, in the present embodiment 1, the magnet wire W is wound in a state where the side wall portion R and the side wall portion L formed by elastically deforming the protrusions 41R and 41l of the axial-end surface portion 4 so as to achieve the reduction in the circumferential direction Z are pressed and fixed to be retained by the retaining tool 79. Thus, the axial-end surface portion 4 and the split core 31 can be completely prevented from being displaced from each other at the time of winding.

Next, the split core unit 30 is released from the retaining tool 79. At this time, the protrusions 41R and 41L of the axial-end surface portion 4 are released from pressure applied by the retaining tool 79, and thus the protrusions 41R and 41L are restored from an elastically deformed state. There may be a case where the protrusions 41R and 41L are not entirely restored from the elastically deformed state. Next, a combining step is performed in which the split core units 30 having the coils 5 formed thereon as shown in FIG. 2 are arranged in an annular shape and fixed, and the winding-starting end and the winding-finishing end of each coil 5 are electrically connected to a printed circuit board or the like (not shown), thereby forming the stator 3 shown in FIG. 1 (step ST5 in FIG. 9).

At this time, as shown in FIG. 1 and FIG. 4, the protrusions 41R and 41L of each of the axial-end surface portions 4 of the split core units 30 arranged in the circumferential direction Z so as to form an annular shape are fitted to the cut portions 4kR and 4kL of other split core units 30 that are adjacent in the circumferential direction Z, so that the protrusions 41R and 41L of the axial-end surface portions 4 between the split core units 30 adjacent to each other in the circumferential direction Z do not interfere with each other. Next, an assembling step is performed in which the stator 3 is inserted on the inner side X2 in the radial direction X of the frame 1 and fixed, and the rotor 2 is disposed so as to be rotatably supported by the frame 1 on the inner side X2 in the radial direction X of the stator 3, thereby forming the rotary electric machine 100 (FIG. 1, and step ST6 in FIG. 9).

In the above-described embodiment 1, the example has been described in which the magnet wire W is wound by rotating the intermediate 30A about the center axis A. However, the present disclosure is not limited to this example. For example, as shown in FIG. 16, a method may be employed in which a flyer 77 having a nozzle 76B may be caused to revolve around a center axis G of the intermediate 30A, to wind the magnet wire W around the intermediate 30A.

In the winding method in which the coil 5 is formed by rotating the intermediate 30A at the time of winding of the magnet wire W, if the center of gravity of the intermediate 30A is deviated from the center axis A, eccentric centrifugal force is generated on the intermediate 30A according to the rotation speed. This causes concentration stress on a contact surface between the retaining tool 79 and the intermediate 30A. In contrast, the flyer 77 does not cause such concentration of stress, and thus the speed of winding of the magnet wire W can be increased regardless of the position of the center of gravity of the intermediate 30A, whereby productivity for the split core unit 30 can be improved. In particular, this is effective in winding around an intermediate 30A having a large volume and a large mass.

If a retaining tool is pressed against the split core unit from the inner side in the radial direction of the split core as in a comparative example (not shown), a flyer that rotationally moves during winding and the retaining tool for retaining the split core are located on the inner side in the radial direction of the split core, and thus the mechanism of the winding device is likely to be complicated and enlarged. In contrast, in the present embodiment 1, no retaining tool is needed on the inner side X2 in the radial direction X of the split core 31. Thus, as compared to the comparative example (not shown), the configuration of the flyer 77 can be simplified and downsized, and the production line for the split core unit 30 and the rotary electric machine 100 can be made inexpensive.

A stator for a rotary electric machine according to embodiment 1 configured as described above is a stator for a rotary electric machine, the stator including:
a plurality of split iron cores which are combined with each other to form an annular shape, and which have yoke portions arranged along an outer circumference of the annular shape and tooth portions protruding to an inner side in a radial direction from the yoke portions;
insulators disposed at both ends in an axial direction of each split iron core; and
a coil wound around each tooth portion through at least parts of the insulators, wherein
the insulators have protrusions protruding from end surfaces in a circumferential direction of each yoke portion, and,
when the coil is wound around the tooth portion, each protrusion is deformed, thereby being fixed together with the yoke portion.

A rotary electric machine according to embodiment 1 configured as described above is a rotary electric machine including:
a rotor having an outer circumferential surface that opposes an inner circumferential surface of the stator, the rotor being retained so as to be rotatable about a rotation shaft disposed at a center in the radial direction of the stator; and
a frame covering at least a part of an outer circumferential surface of the stator and supporting the rotation shaft.

A producing method for a stator for a rotary electric machine according to embodiment 1 configured as described above is a producing method for a stator for a rotary electric machine, the stator including:
a plurality of split iron cores which are combined with each other to form an annular shape, and which have yoke portions arranged along an outer circumference of the annular shape and tooth portions protruding to an inner side in a radial direction from the yoke portions;
insulators disposed at both ends in an axial direction of each split iron core; and
a coil wound around each tooth portion through at least parts of the insulators,
the producing method including:
a retaining step of pressing and deforming, by using holding claws disposed at both ends in a circumferential direction of each of the yoke portions of the split iron cores, protrusions which are formed on the insulators and which protrude from both end surfaces in the circumferential direction of the yoke portion, thereby holding the protrusions together with both end surfaces in the circumferential direction of the yoke portion and retaining the insulators together with the split iron core; and
a winding step of winding, by a winding machine, the coil around the tooth portion of each split iron core through at least parts of the insulators.

Accordingly, it becomes easy to perform replacement work during production of different types of stators and different types of rotary electric machines, no dedicated retaining tool is required for each type, and production cost can be reduced.

Further, a split core unit, a rotary electric machine, a producing method for a split core unit, and a producing method for a rotary electric machine according to embodiment 1 configured as described above are as follows.

The split core unit is in a rotary electric machine formed by arranging a plurality of split cores in an annular shape, each split core including a yoke portion and a tooth portion protruding to an inner side in a radial direction from the yoke portion. The split core unit includes: the split core; a coil formed on the tooth portion; and insulation portions which electrically insulate the split core and the coil from each other, wherein the insulation portions include axial-end surface portions covering both end surfaces in an axial direction of the split core, and each axial-end surface portion has, on end surfaces thereof in a circumferential direction on the yoke portion, protrusions which protrude from end surfaces in the circumferential direction of the yoke portion.

The rotary electric machine includes: a stator including a plurality of the split core units and formed by arranging the plurality of the split core units in an annular shape; a frame in which the stator is disposed on an inner side in the radial direction; and a rotor disposed on an inner side in the radial direction of the stator and rotatably supported by the frame.

The producing method for the split core unit includes: a mounting step of respectively mounting the axial-end surface portions to both ends in the axial direction of the split core; a retaining step of causing an abutment portion of a holding tool, which has two holding claws operable and closable in the circumferential direction and the abutment portion for abutting an outer circumferential surface on a circumferentially outer side of each axial-end surface portion, to abut the outer circumferential surface on the circumferentially outer side of the axial-end surface portion from a circumferentially outer side in a state where the two holding claws are opened in the circumferential direction, and thereafter, closing the two holding claws in the circumferential direction so that the end surfaces in the circumferential direction of the axial-end surface portion and the end surfaces in the circumferential direction of the yoke portion are held between inner sides in the circumferential direction of the two holding claws, so as to deform the protrusions of the axial-end surface portion, thereby retaining the split core by the holding tool; and a winding step of forming the coil around the axial-end surface portion and the split core which are fixed by the holding tool.

The producing method for the rotary electric machine includes: a combining step of combining a plurality of split core units, each of which is produced by the producing method for the split core unit, in an annular shape so as to form a stator; and
an assembling step of inserting the stator in a frame so as to fix the stator, and disposing a rotor on the inner side in the radial direction of the stator such that the rotor is rotatably supported by the frame.

Accordingly, it becomes easy to perform replacement work during production of different types of split core units and different types of rotary electric machines, no dedicated retaining tool is required for each type, and production cost can be reduced.

Specific effects will be described as follows based on the above-described embodiment 1. When the two axial-end surface portions 4 and the split core 31 are retained by the retaining tool 79, the angle formed between the holding claws 79$a$ and 79$b$ and the angle formed between the end surfaces 31$y$R and 31$y$L at both sides in the circumferential direction Z of the yoke portion 31$y$ are equal to each other. That is, if the number of the split cores 31 is the same, the same retaining tool 79 can be used. Thus, unlike the comparative example (not shown), it is not necessary to change the retaining tool for manufacturing of each of split core units that are different in the curvatures of the inner circumferential surfaces of the shoe portions and the radially inner end of the tooth portion, the curvature of the outer circumferential surface of the yoke portion, and the curvature of the inner flange or the outer flange.

In addition, if the length in the axial direction Y of the retaining tool 79 is set to be equal to the longest one of the lengths in the axial direction Y of the split cores 31 of the rotary electric machine 100 to be produced, it is not necessary to change the retaining tool according to variation in the stacking thickness in the axial direction Y of the split core 31, unlike the comparative example (not shown).

In addition, no variation in the trajectory of the magnet wire W with respect to the intermediate 30A at the time of winding occurs owing to replacement work for the retaining tool 79, and the magnet wire W can be wound to a predetermined position on the intermediate 30A, whereby regularity of the coil 5 can be improved. Accordingly, the number of turns of the coil 5 can be increased, and the output of the rotary electric machine 100 is enhanced.

In addition, since the setup time for the retaining tool 79 is shortened, productivity for the split core unit 30 can be improved.

In addition, since it is not necessary to change the retaining tool 79 according to the shape of the split core unit 30 to be produced, the number of retaining tools 79 can be reduced, and management complexities for the retaining tools 79 can be reduced. In addition, as described above, the intermediate 30A is fixed by the retaining tool 79 from only one side, i.e., the outer side X1 in the radial direction X of the split core 31, and thus no retaining tool for retaining the intermediate from the split core side as in the comparative example (not shown) is needed, whereby the winding device can be downsized. Accordingly, the production line for the split core unit can be made inexpensive.

In addition, each axial-end surface portion has the cut portions located so as to oppose the protrusions of the axial-end surface portions of other split core units that are adjacent in the circumferential direction, and insertion into the cut portions of the other split core units that are adjacent in the circumferential direction is performed. Thus, the protrusions between the split core units adjacent to each other in the circumferential direction are prevented from interfering with each other.

In addition, the protrusions of each axial-end surface portion, and the cut portions of the axial-end surface portions of other split core units that are adjacent in the circumferential direction, are formed stepwise in the radial direction at such positions as to oppose each other in the circumferential direction. Thus, the configuration of the protrusions and the cut portions can be simplified.

In addition, the tooth portion has the shoe portions which respectively protrude to both sides in the circumferential direction from the radially inner end of the tooth portion, and each axial-end surface portion includes the pair of first engagement claws to be engaged with the outer circumferential surfaces on the radially outer sides of the respective shoe portions, and the pair of second engagement claws to be engaged with the inner circumferential surface on the radially inner side of the yoke portion. Accordingly, the axial-end surface portion is fixed to the split core by the first engagement claws and the second engagement claws. Therefore, when the axial-end surface portion is disposed on the split core, no adhesive needs to be used, and thus material cost for an adhesive can be reduced and various management complexities and the like are eliminated. In addition, no applicator for an adhesive, no curing oven for an adhesive, or the like is needed, and thus equipment investment cost can be reduced. Further, since an adhesive applying step is eliminated, the installation space for the production line can be reduced. Therefore, it is possible to facilitate improvement of productivity and cost reduction for the split core unit and the rotary electric machine.

Further, by engagement between the split core and the first engagement claws and engagement between the split core and the second engagement claws, the position of the axial-end surface portion relative to the split core is determined. Therefore, if winding is performed while the split core and the insulation portion are fixed to a winding device by different retaining tools as in the conventional example, the relative positional relationship between the split core and the insulation portion varies within a range for elastic restoring forces of the first engagement claws and the second engagement claws. However, in the present embodiment 1, since the split core unit is fixed by the retaining tool, no variation in the relative positional relationship between the split core and the axial-end surface portion occurs. Accordingly, at the time of forming the coil, the positional relationship between the axial-end surface portion and the trajectory of the magnet wire for forming the coil is stabilized, and the coil can be formed at a predetermined position on the split core unit. Therefore, regularity of the coil is improved. Accordingly, the number of turns of the coil can be increased, and the output of the rotary electric machine can be enhanced.

In addition, since each insulation portion is formed of a material that is more likely to undergo elastic deformation than the material of the split core, the producing method described above can be assuredly performed because of elastic deformation or plastic deformation of the insulation portion.

Embodiment 2

Figure 17:
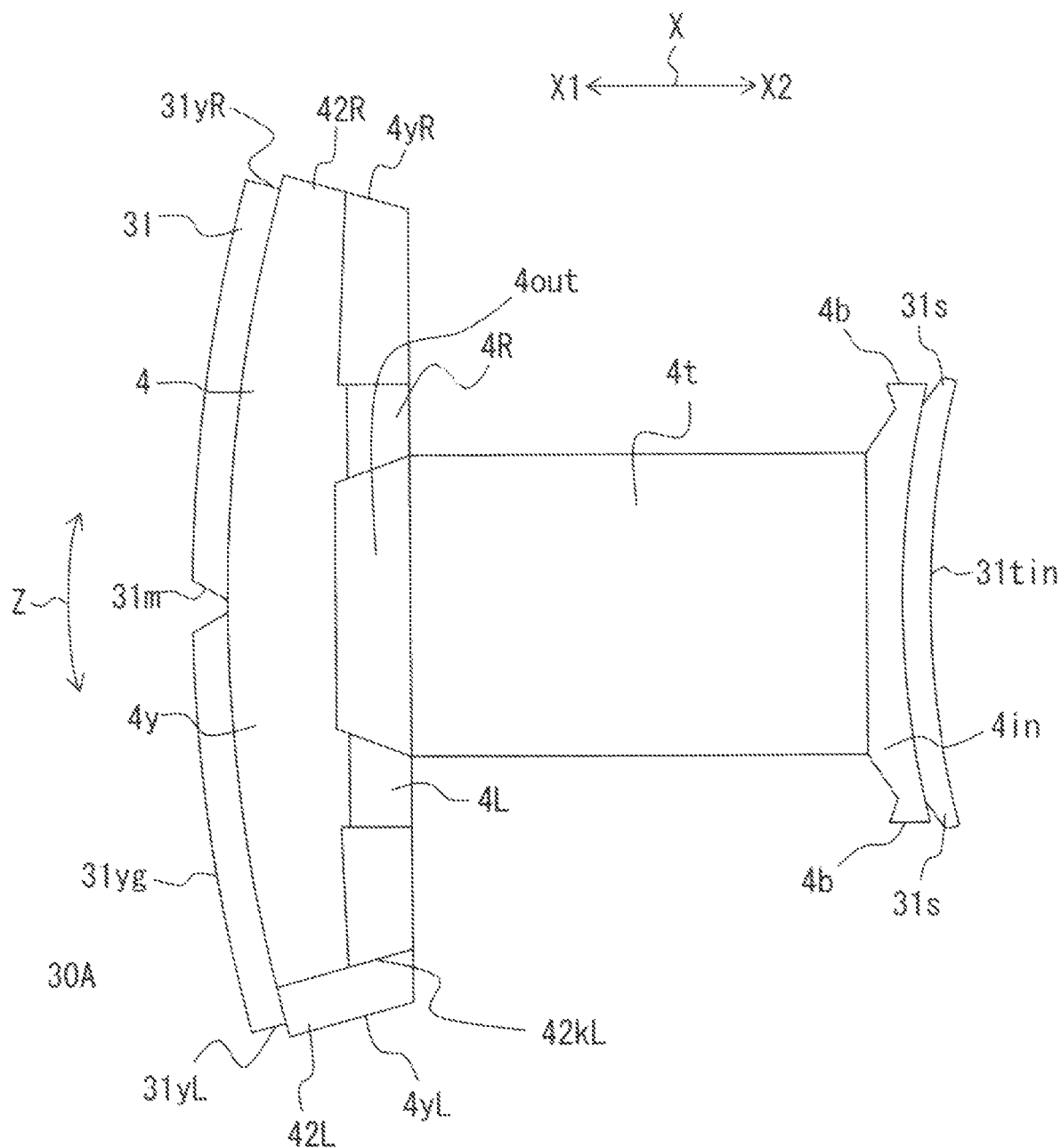
FIG. 17 is a plan view showing a configuration of an intermediate of a split core unit according to embodiment 2.
Figure 18:
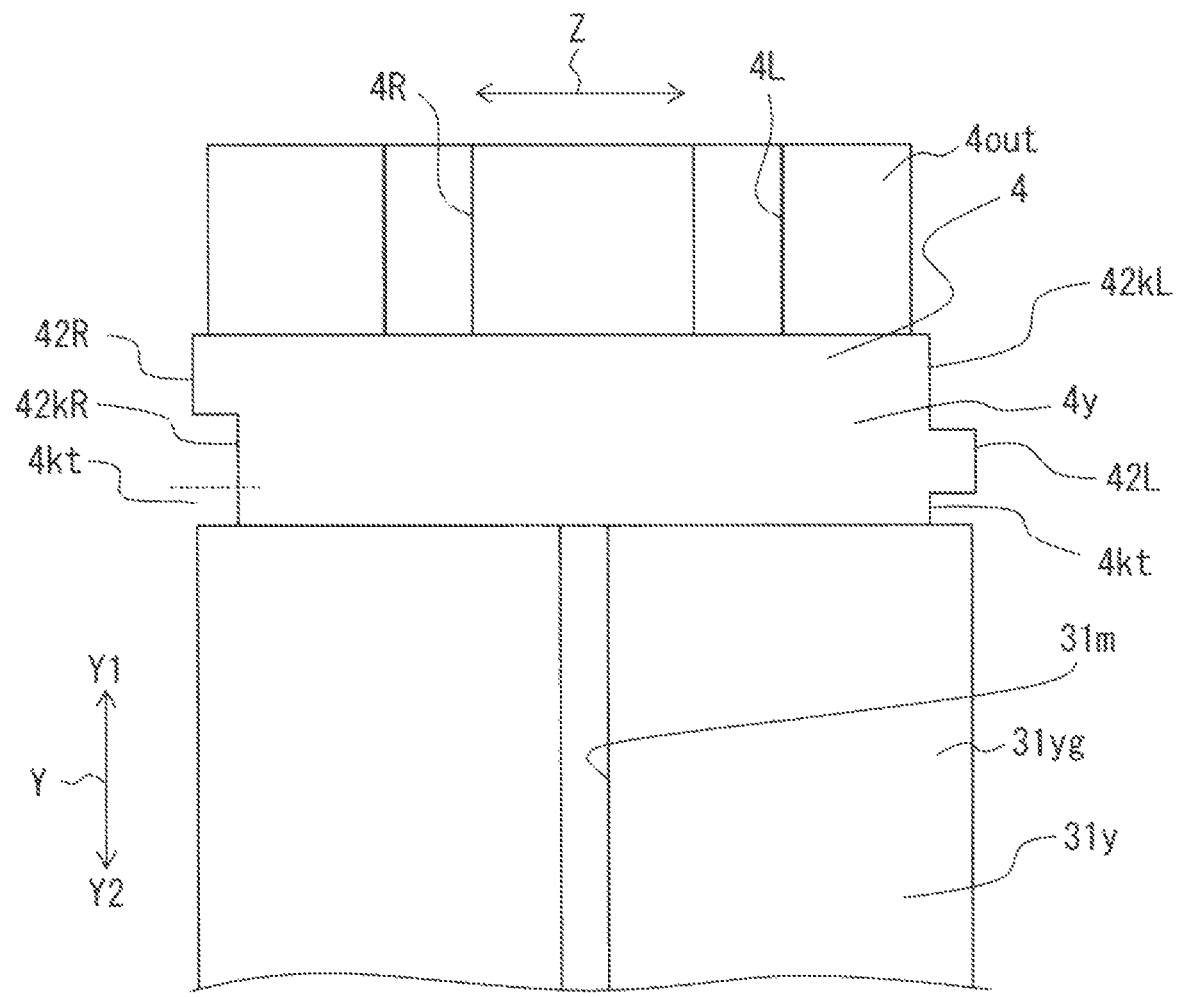
FIG. 18 is a side view showing the configuration of the intermediate of the split core unit shown in FIG. 17.
Figure 19:
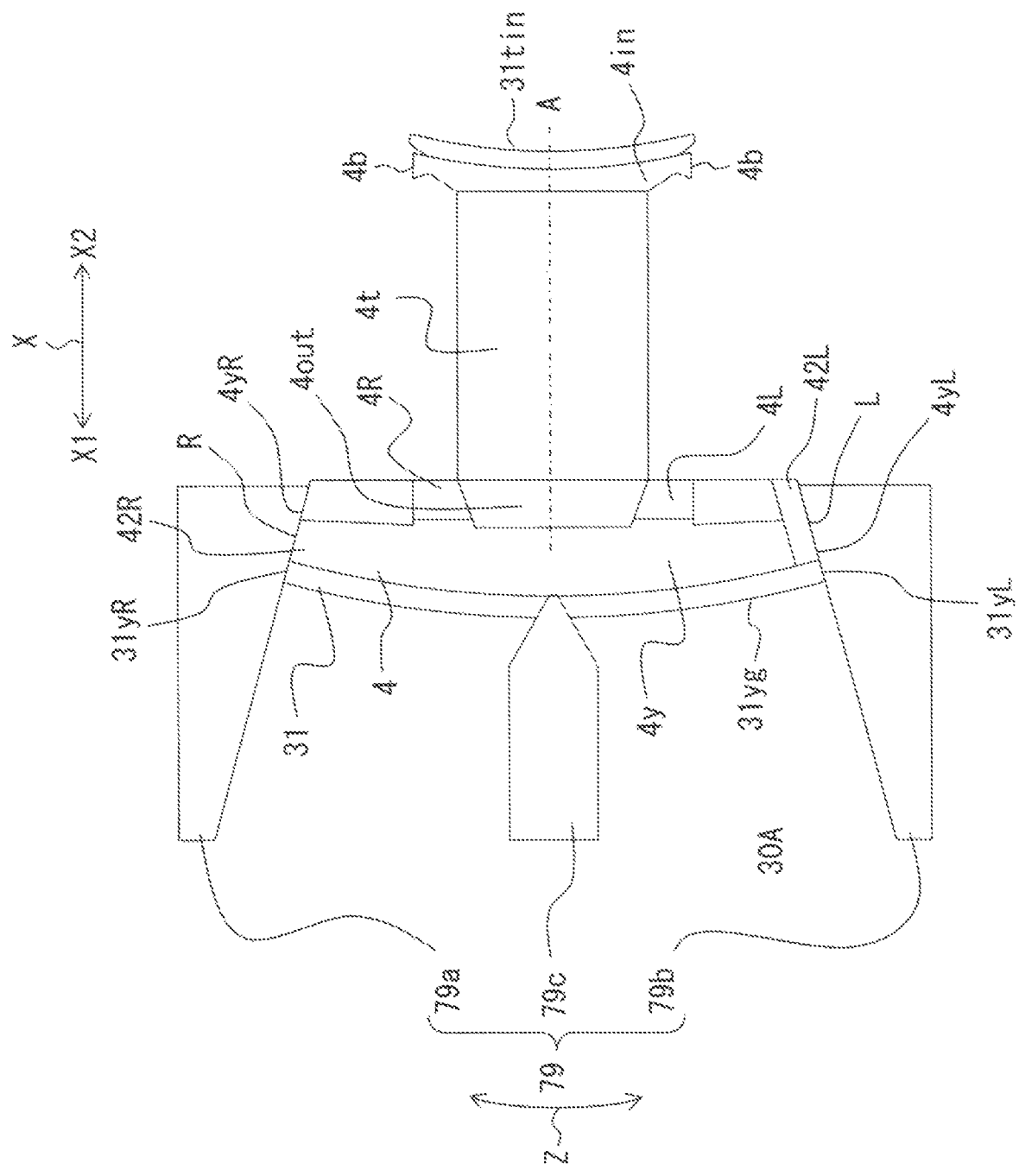
FIG. 19 is a diagram for explaining a producing method for the split core unit according to embodiment 2.
Figure 20:
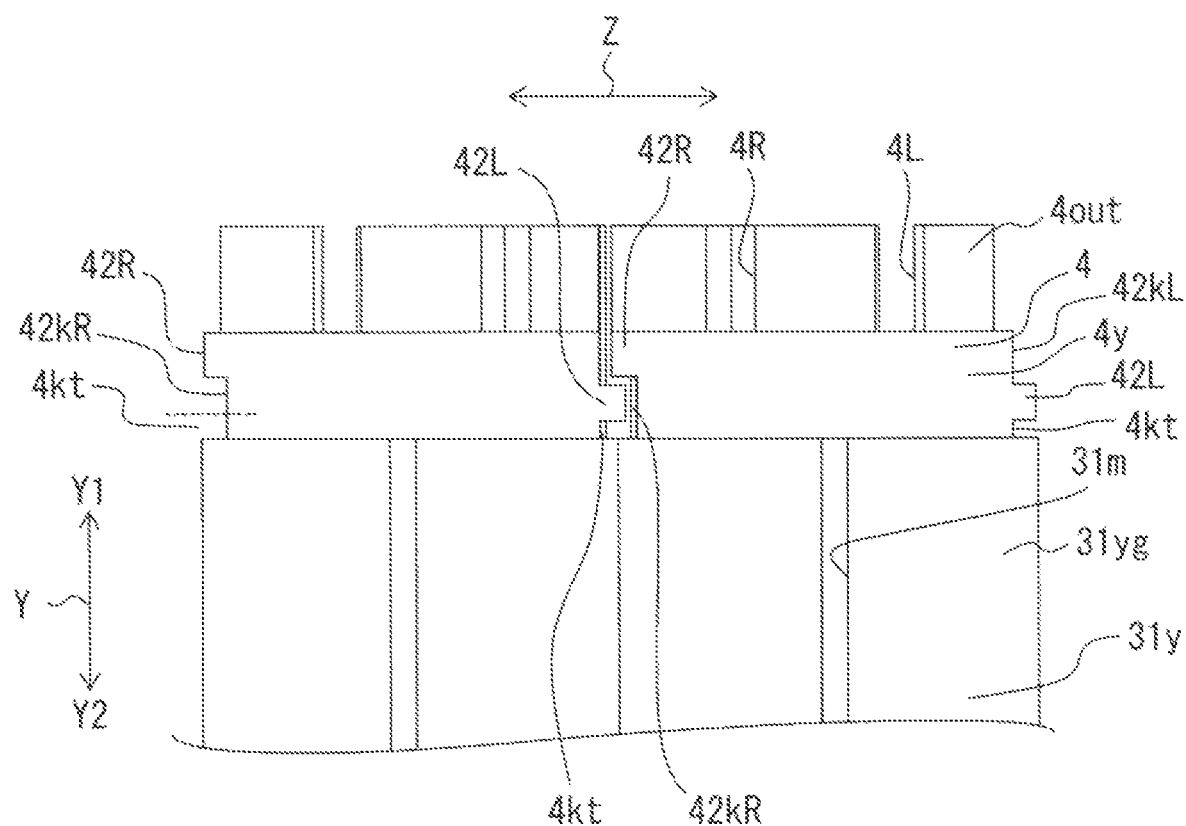
FIG. 20 is a side view indicating a state where the split core units according to embodiment 2 are annularly assembled.

FIG. 17 is a plan view showing a configuration of an intermediate of a split core unit of a stator for a rotary electric machine according to embodiment 2. FIG. 18 is a side view showing a configuration of the intermediate shown in FIG. 17. FIG. 19 is a plan view for explaining a producing method for the split core unit of the rotary electric machine according to embodiment 2. FIG. 20 is a side view indicating a state where two split core units according to embodiment 2 are joined together in the circumferential direction.

In the drawings, the same portions as those in the above-described embodiment 1 are denoted by the same reference characters, and description thereof is omitted. In the above-described embodiment 1, the example has been described in which the protrusions 41R and 41L formed on the end surfaces 4yR and 4yL at both sides in the circumferential direction Z of each axial-end surface portion 4, and the cut portions 4kR and 4kL of the axial-end surface portions 4 of other split core units 30 that are adjacent in the circumferential direction Z, are formed stepwise in the radial direction X at such positions as to oppose each other in the circumferential direction Z. Meanwhile, in the present embodiment 2, as shown in FIG. 17 and FIG. 18, protrusions 42R and 42L of the end surfaces 4yR and 4yL at both sides in the circumferential direction Z of each axial-end surface portion 4, and cut portions 42kR and 42kL of the axial-end surface portions 4 of other split core units 30 that are adjacent in the circumferential direction Z, are formed stepwise in the axial direction Y at such positions as to oppose each other in the circumferential direction Z. The other portions are the same as those in the above-described embodiment 1, and thus description thereof is omitted, as appropriate.

Next, a producing method for the split core unit 30 of embodiment 2 configured as described above will be described. When the same step as that in the above-described embodiment 1 is performed to achieve the retaining by the retaining tool 79 as shown in FIG. 19 in the same manner as in the above-described embodiment 1, the protrusions 42R and 42L are elastically deformed, and the holding claws 79a and 79b are moved and brought into contact with the end surfaces 31yR and 31yL of the yoke portion 31y of the split core 31. Therefore, the holding claws 79a and 79b are, by frictional forces thereof, engaged and fixed along the side wall portion R and the side wall portion L formed by the end surfaces 31yR and 31yL of the yoke portion 31y, the end surfaces 4yR and 4yL of each axial-end surface portion 4, and the elastically deformed protrusions 42R and 42L of the axial-end surface portion 4. Therefore, as in the above-described embodiment 1, the two axial-end surface portions 4 and the split core 31 are assuredly retained by the retaining tool 79.

Next, the same step as that in the above-described embodiment 1 is performed to form the coil 5, thereby forming the split core unit 30. Next, the split core units 30 having the coils 5 formed thereon are arranged in an annular shape and fixed, thereby forming the stator 3. At this time, as shown in FIG. 20, the protrusions 42R and 42L of each of the axial-end surface portions 4 of the split core units 30 arranged in the circumferential direction Z so as to form the annular shape are fitted to the cut portions 42kR and 42kL of other split core units 30 that are adjacent in the circumferential direction Z, so that the protrusions 42R and 42L of the axial-end surface portions 4 between the split core units 30 adjacent to each other in the circumferential direction Z do not interfere with each other. Hereinafter, the same step as that in the above-described embodiment 1 is performed to form the rotary electric machine 100.

According to a stator for a rotary electric machine, a rotary electric machine, and a producing method for a stator for a rotary electric machine of embodiment 2 configured as described above, the same advantageous effects as those in the above-described embodiment 1 are exhibited, as a matter of course. In addition, since the protrusions of each axial-end surface portion, and the cut portions of the axial-end surface portions of other split core units that are adjacent in the circumferential direction, are formed stepwise in the axial direction at such positions as to oppose each other in the circumferential direction, the configuration of the protrusions and the cut portions is simplified.

Further, the end surfaces at both sides in the circumferential direction of the axial-end surface portion do not need to have any cut portions that are formed so as to reduce the width in the circumferential direction of the axial-end surface portion, and the width in the radial direction of each protrusion of the axial-end surface portion allows ensuring of the width in the radial direction of the corresponding end surface in the circumferential direction of the axial-end surface portion. Thus, damage to the protrusion due to the retaining tool can be prevented. Therefore, even if the axial-end surface portion is formed so as to have a small width in the radial direction, the effect of the protrusion can be obtained. Accordingly, the split core unit and the rotary electric machine can be downsized.

Embodiment 3

Figure 21:
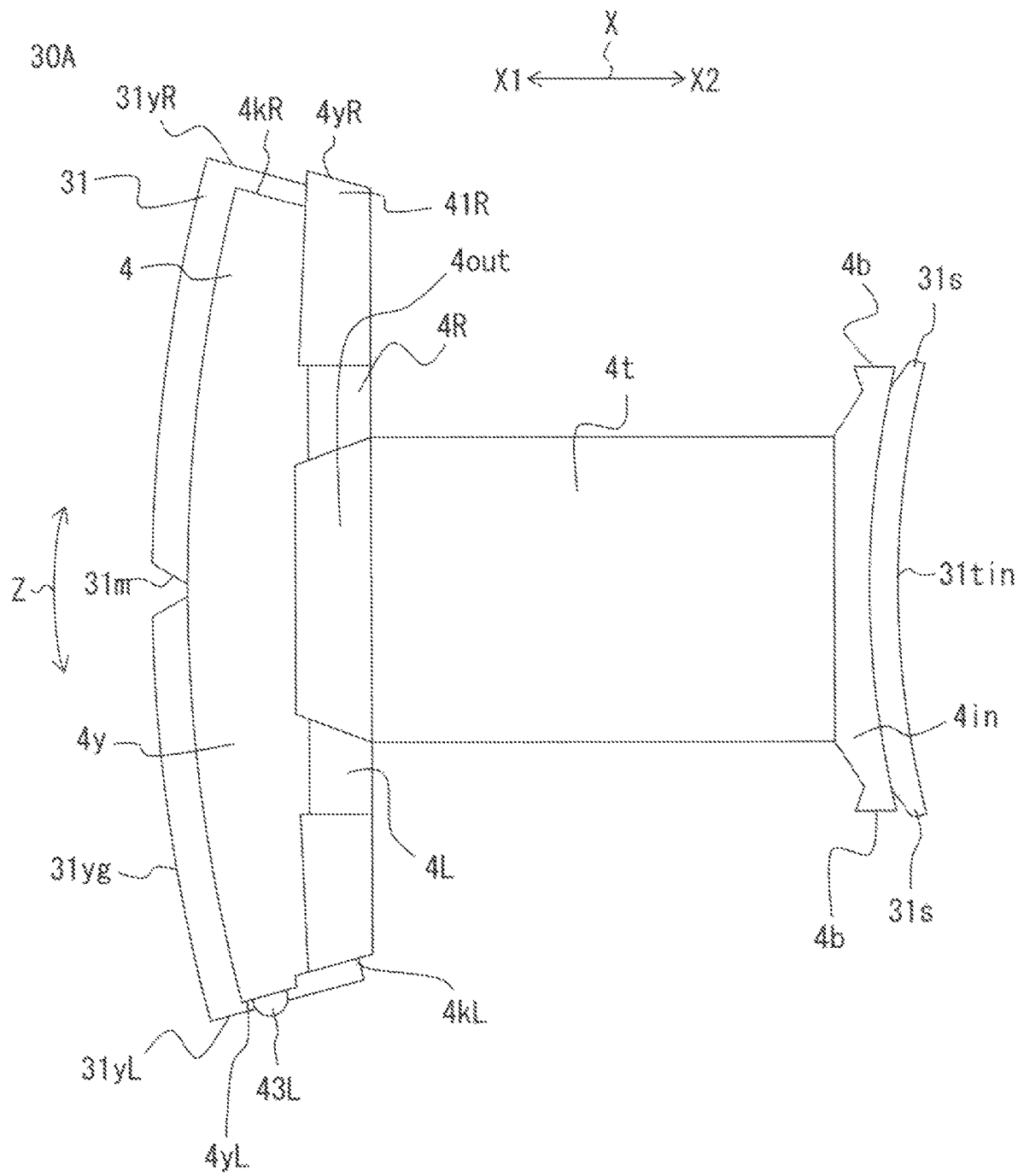
FIG. 21 is a plan view showing a configuration of an intermediate of a split core unit according to embodiment 3.
Figure 22:
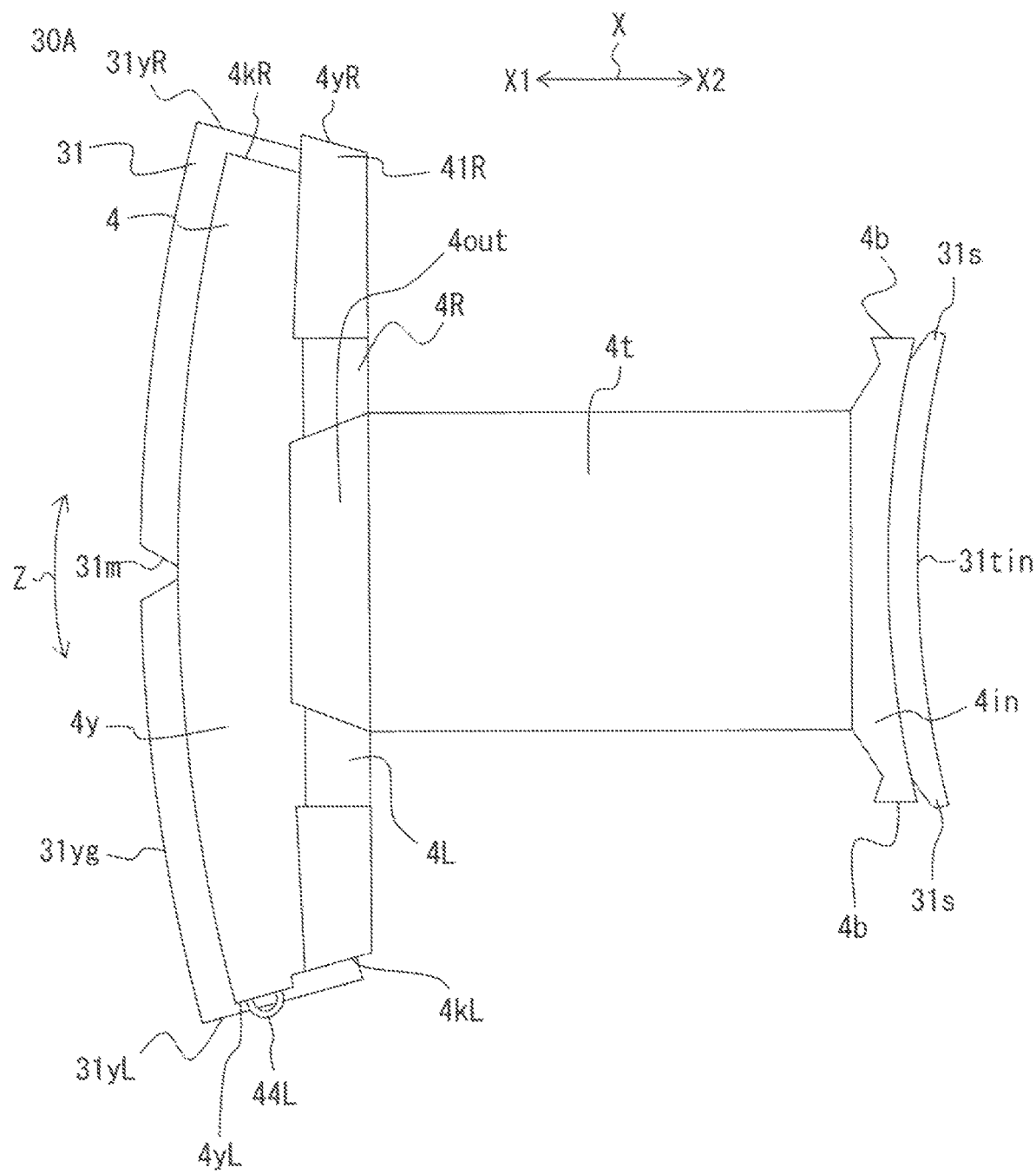
FIG. 22 is a plan view showing another configuration of the intermediate of the split core unit according to embodiment 3.

FIG. 21 is a plan view showing a configuration of an intermediate of a split core unit of a stator for a rotary electric machine according to embodiment 3. FIG. 22 is a plan view showing another configuration of the intermediate of the split core unit of the stator for the rotary electric machine according to embodiment 3. In the drawings, the same portions as those in the above-described embodiments are denoted by the same reference characters, and description thereof is omitted.

In the present embodiment 3, as shown in FIG. 21, a protrusion 43L formed such that an outer peripheral plane thereof in the circumferential direction Z as a cross section perpendicular to the axial direction Y has an arc shape, is provided instead of the protrusion 41L of the above-described embodiment 1. Although the example in which the outer peripheral plane in the circumferential direction Z of the protrusion 43L as the cross section perpendicular to the axial direction Y has an arc shape, has been described, the outer peripheral plane may have an elliptical shape. As an alternative case, a case will also be described where a protrusion 44L formed such that a cross section thereof perpendicular to the axial direction Y has a shape including a hollow, is provided as shown in FIG. 20. The other portions are the same as those in the above-described embodiments, and thus description thereof is omitted, as appropriate.

According to the present embodiment 3, the protrusion 43L, 44L is thus formed such that the outer peripheral plane thereof in the circumferential direction Z as the cross section perpendicular to the axial direction Y has an arc shape, an elliptic arc shape, or a shape including a hollow. Thus, the protrusion 43L, 44L is more likely to undergo elastic deformation than the protrusion 41L described in the above-described embodiment 1. Therefore, as compared to the above-described embodiment 1, the force of the retaining tool may be reduced, and fracture of the axial-end surface portion 4 is prevented.

According to a stator for a rotary electric machine, a rotary electric machine, and a producing method for a stator for a rotary electric machine of embodiment 3 configured as described above, the same advantageous effects as those in the above-described embodiments are exhibited, as a matter of course. In addition, the protrusion of the axial-end surface portion is formed such that the outer peripheral plane thereof in the circumferential direction has an arc shape, an elliptic arc shape, or a hollow shape, and thus it is easier to elastically deform or plastically deform the protrusion than in the above-described embodiments. Accordingly, the pressing force of the retaining tool can be reduced, and fracture of the axial-end surface portion can be prevented.

Although the example where one protrusion 43L, 44L is formed on each split core unit 30 has been described in the above-described embodiment 3, the present disclosure is not limited to this example, and a plurality of the protrusions may be formed on each split core unit 30.

Embodiment 4

Figure 23:
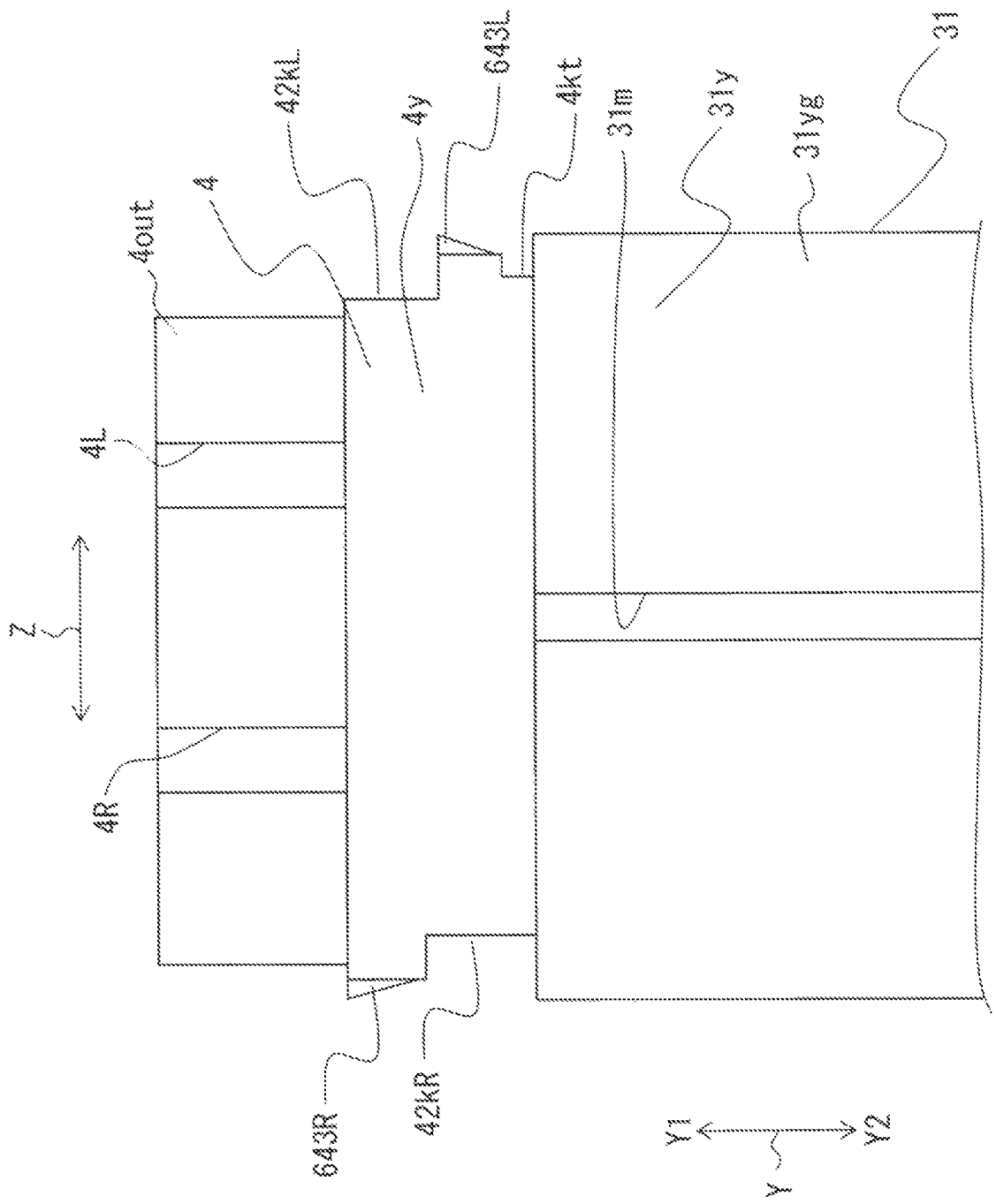
FIG. 23 is a side view showing a configuration of an intermediate of a split core unit according to embodiment 4.
Figure 24:
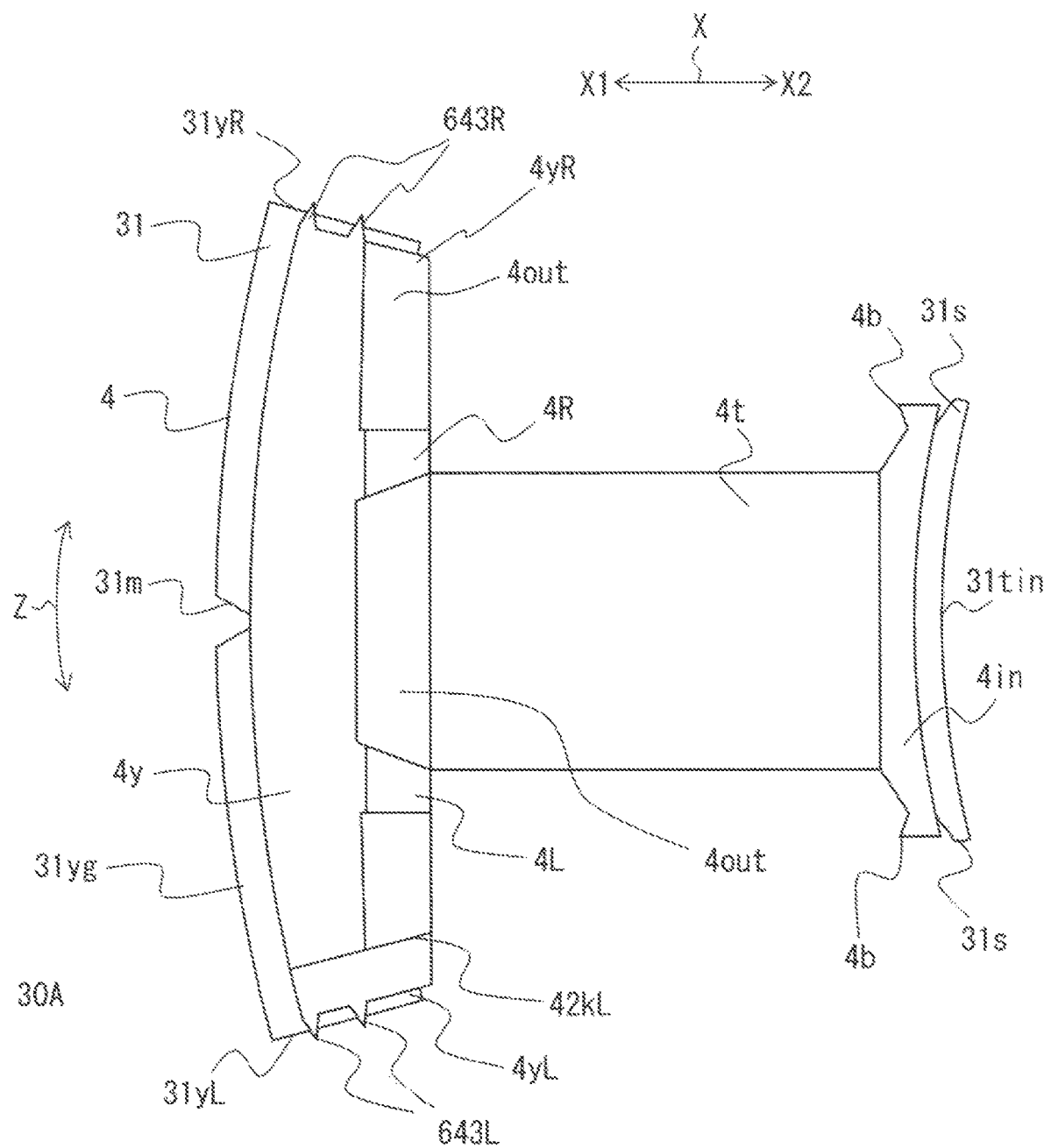
FIG. 24 is a plan view showing the configuration of the intermediate of the split core unit shown in FIG. 23.
Figure 25:
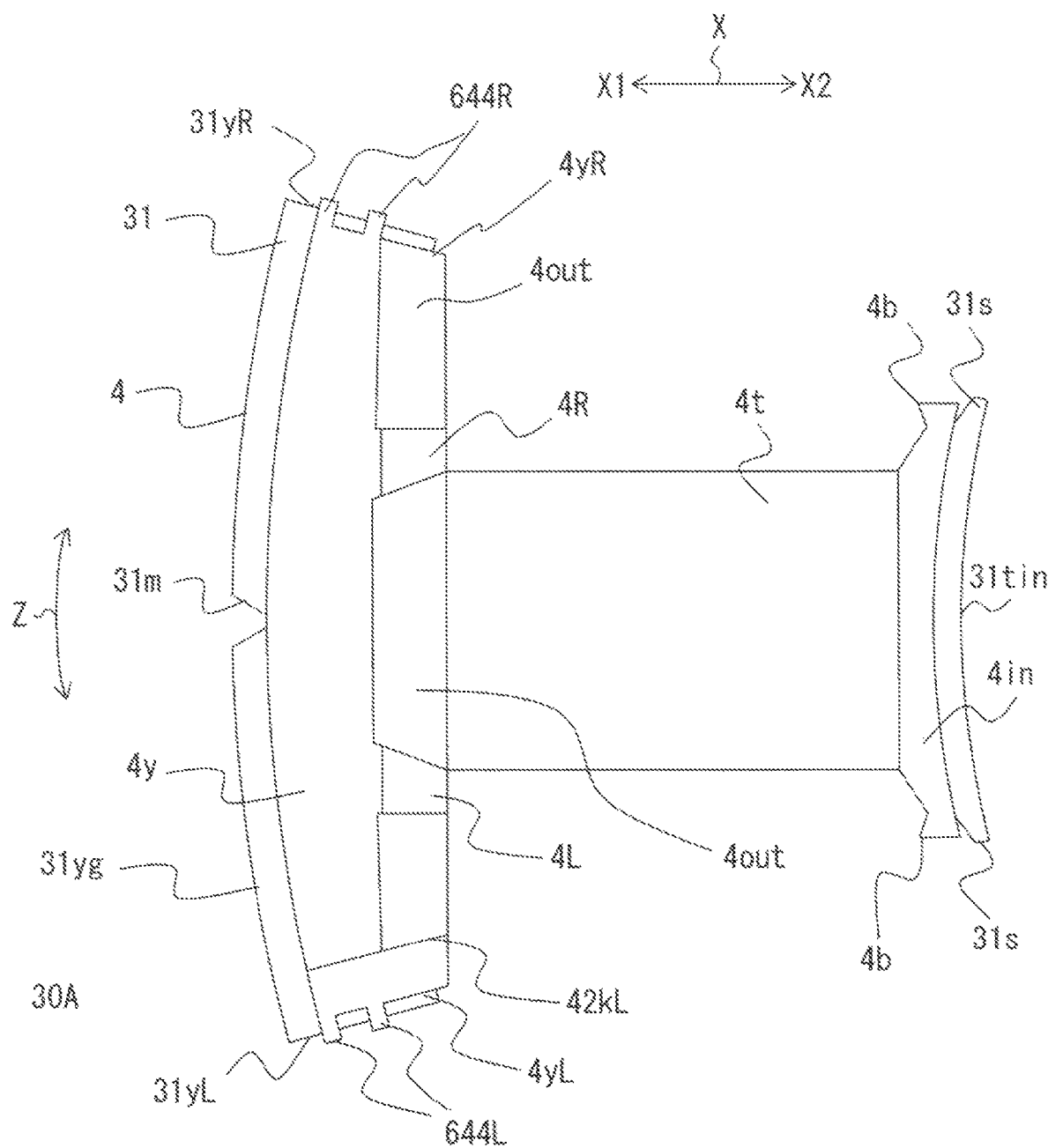
FIG. 25 is a plan view showing another configuration of the intermediate of the split core unit according to embodiment 4.

FIG. 23 is a side view showing a configuration of an intermediate of a split core unit of a stator for a rotary electric machine according to embodiment 4. FIG. 24 is a plan view showing a configuration of the intermediate of the split core unit shown in FIG. 23. FIG. 25 is a plan view showing another configuration of the intermediate of the split core unit of the stator for the rotary electric machine according to embodiment 4. In the drawings, the same portions as those in the above-described embodiments are denoted by the same reference characters, and description thereof is omitted.

In the present embodiment 4, as shown in FIG. 23 and FIG. 24, protrusions 643L and 643R each having a so-called triangular pyramid shape tapered such that the protrusion amount thereof decreases toward the lower side Y2 in the axial direction Y, are provided instead of the protrusions 42L and 42R of the above-described embodiment 2. As an alternative case, a case will also be described where protrusions 644L and 644R each formed in a quadrangular pyramid shape are provided as shown in FIG. 25. The other portions are the same as those in the above-described embodiments, and thus description thereof is omitted, as appropriate.

According to the present embodiment 4, the protrusions 643L and 643R, or 644L and 644R, are thus formed so as to be tapered in the axial direction Y. Thus, the protrusions 643L and 643R, or 644L and 644R, facilitate assembling in the axial direction Y, are likely to undergo elastic deformation, and have small deformation amounts. Therefore, force for assembling may be reduced, and fracture of the axial-end surface portion 4 is prevented.

According to a stator for a rotary electric machine, a rotary electric machine, and a producing method for a stator for a rotary electric machine of embodiment 4 configured as described above, the same advantageous effects as those in the above-described embodiments are exhibited, as a matter of course. In addition, the protrusions of the axial-end surface portion are formed so as to be tapered such that the protrusion amounts thereof decrease toward the tooth side in the axial direction, and thus the protrusions are further likely to undergo elastic deformation or plastic deformation. Therefore, the force for assembling the axial-end surface portion can be reduced, and fracture of the axial-end surface portion can be prevented.

In the above-described embodiment 4, although the example in which the two protrusions 643L and 643R, or 644L and 644R, are formed on each split core unit 30, has been described, the present disclosure is not limited to this example, and one or a plurality of the protrusions may be formed on each split core unit 30. Also in this case, the same advantageous effects can be exhibited.

Although not particularly described in the above-described embodiments, the split core 31 in which a plurality of steel sheets are stacked in the axial direction Y such that: the steel sheets are fixed to each other in the axial direction Y, has been used as an example, but the split core 31 is not limited thereto. For example, in a case where a split core 31 in which a plurality of steel sheets are stacked in the axial direction Y but the steel sheets are not fixed to each other in the axial direction Y, is used, the steel sheets of the split core 31 are retained in the axial direction Y with use of the retaining tool 79 so as to be fixed to each other in the axial direction Y. In this retained and fixed state, the axial-end surface portions 4 are assembled to the end surfaces on the upper side Y1 and the lower side Y2 in the axial direction Y of the tooth portion 31$t$, and the magnet wire W is wound around the tooth portion 31$t$ so as to form the coil 5, whereby the split core unit 30 can be formed in the same manner as in the above-described embodiments.

Although the examples in which the protrusions are elastically deformed have been described in the above-described embodiments, the present disclosure is not limited to the examples, and the present disclosure can be implemented in the same manner also in a case where the protrusions are plastically deformed. Also in the case where the protrusions are plastically deformed, the protrusions are assumed to be slightly restored, and thus it can be said that the cut portions formed at such locations as to oppose the protrusions exhibit the same advantageous effects as those in the above-described embodiments.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100 rotary electric machine
1 frame
10 insulation portion
2 rotor
20 rotation shaft
21 magnet
3 stator
30 split core unit
30A intermediate
31 split core
31$y$ yoke portion
31$y$R end surface
31$y$L end surface
31$yin$ inner circumferential surface
31$yg$ outer circumferential surface
31$s$ shoe portion
31$sg$ outer circumferential surface
31$t$ tooth portion
31$tin$ end
31$ts$ side surface
31$m$ insertion groove
4 axial-end surface portion
4$b$ first engagement claw
4$c$ second engagement claw
4$d$ claw portion
4$t$ tooth covering portion
4$y$ yoke covering portion
4$in$ inner flange
4$out$ outer flange
4R first groove
4L second groove
4$y$R end surface
4$y$L end surface
4$k$R cut portion
4$k$L cut portion
42$k$R cut portion
42$k$L cut portion
41R protrusion
42L protrusion
42R protrusion
42L protrusion
43L protrusion
44L protrusion
4$kt$ cut portion 5 coil
5St starting end
6 side surface portion
6t end
643R protrusion
643L protrusion
644R protrusion
644L protrusion
70 winding device
75 chuck
76 nozzle
77 flyer
79 retaining tool
79a holding claw
79b holding claw
79c abutment portion
W magnet wire
A center axis
B arrow
C arrow
D arrow
E region
F region
G center axis
R side wall portion
L side wall portion
X radial direction
X1 outer side
X2 inner side
Y axial direction
Z circumferential direction

The invention claimed is:

1. A stator for a rotary electric machine, the stator comprising:
a plurality of split iron cores which are combined with each other to form an annular shape, and which have yoke portions arranged along an outer circumference of the annular shape and tooth portions protruding to an inner side in a radial direction from the yoke portions;
insulators disposed at both ends in an axial direction of each split iron core; and
a coil wound around each tooth portion through at least parts of the insulators, wherein
the insulators have protrusions protruding from end surfaces in a circumferential direction of each yoke portion,
when the coil is wound around the tooth portion, each protrusion is deformed, thereby being fixed together with the yoke portion, and
among the insulators that are each disposed at one of the ends in the axial direction of a corresponding one of the split iron cores adjacent to each other in the circumferential direction,
one insulator has, at a one-side end thereof in the circumferential direction, a first protrusion among the protrusions and a first cut portion which is located at an axial position different from an axial position of the first protrusion, and
another insulator has, at an other-side end thereof in the circumferential direction, a second cut portion fitted to the first protrusion and a second protrusion among the protrusions which is fitted to the first cut portion and which is located at an axial position different from an axial position of the second cut portion.

2. The stator for a rotary electric machine according to claim 1, wherein at least a part of an outermost portion of a cross section, of each protrusion, in the axial direction parallel to the circumferential direction, is formed so as to be tapered such that a protrusion amount of the part in the circumferential direction decreases toward a corresponding one of the split iron cores in the axial direction.

3. A rotary electric machine comprising:
the stator according to claim 1;
a rotor having an outer circumferential surface that opposes an inner circumferential surface of the stator, the rotor being retained so as to be rotatable about a rotation shaft disposed at a center in the radial direction of the stator; and
a frame covering at least a part of an outer circumferential surface of the stator and supporting the rotation shaft.

4. A producing method for a stator for a rotary electric machine according to claim 1, the producing method comprising:
a retaining step of pressing and deforming, by using holding claws disposed at both ends in a circumferential direction of each of the yoke portions of the split iron cores, protrusions which are formed on the insulators and which protrude from both end surfaces in the circumferential direction of the yoke portion, thereby holding the protrusions together with both end surfaces in the circumferential direction of the yoke portion and retaining the insulators together with the split iron core; and
a winding step of winding, by a winding machine, the coil around the tooth portion of each split iron core through at least parts of the insulators.

5. The stator for a rotary electric machine according to claim 1, wherein the protrusions of one insulator among the insulators disposed at both ends in the axial direction of the split iron cores adjacent to each other in the circumferential direction, are fitted to cut portions of other insulators.

6. The stator for a rotary electric machine according to claim 5, wherein a cross section, of each protrusion, that is perpendicular to the axial direction has a shape including an arc or an elliptic arc.

7. The stator for a rotary electric machine according to claim 5, wherein a cross section, of each protrusion, that is perpendicular to the axial direction has a closed-loop shape.

8. The stator for a rotary electric machine according to claim 5, wherein the protrusions of the one insulator among the insulators disposed at both ends in the axial direction of the split iron cores adjacent to each other in the circumferential direction, and the cut portions of the other insulators fitted to the protrusions, are formed stepwise in the radial direction.

9. The stator for a rotary electric machine according to claim 8, wherein a cross section, of each protrusion, that is perpendicular to the axial direction has a shape including an arc or an elliptic arc.

10. The stator for a rotary electric machine according to claim 8, wherein a cross section, of each protrusion, that is perpendicular to the axial direction has a closed-loop shape.

11. The stator for a rotary electric machine according to claim 1, wherein
each insulator has a plurality of the protrusions respectively protruding from both end surfaces in the circumferential direction of the yoke portion, and,
when the coil is wound around the tooth portion, a holding tool presses and deforms the protrusions from both sides in the circumferential direction, to hold the protrusions together with the yoke portion so that the insulators are fixed together with the split iron core.

12. The stator for a rotary electric machine according to claim 11, wherein the protrusions of one insulator among the insulators disposed at both ends in the axial direction of the split iron cores adjacent to each other in the circumferential direction, are fitted to cut portions of other insulators.

13. The stator for a rotary electric machine according to claim 12, wherein a cross section, of each protrusion, that is perpendicular to the axial direction has a shape including an arc or an elliptic arc.

14. The stator for a rotary electric machine according to claim 12, wherein a cross section, of each protrusion, that is perpendicular to the axial direction has a closed-loop shape.

15. The stator for a rotary electric machine according to claim 12, wherein the protrusions of the one insulator among the insulators disposed at both ends in the axial direction of the split iron cores adjacent to each other in the circumferential direction, and the cut portions of the other insulators fitted to the protrusions, are formed stepwise in the radial direction.

16. The stator for a rotary electric machine according to claim 15, wherein a cross section, of each protrusion, that is perpendicular to the axial direction has a shape including an arc or an elliptic arc.

* * * * *